(12) United States Patent  (10) Patent No.: US 7,653,304 B2
Nozaki et al.                 (45) Date of Patent:    Jan. 26, 2010

(54) DIGITAL CAMERA WITH PROJECTOR AND DIGITAL CAMERA SYSTEM

(75) Inventors: Hirotake Nozaki, Tokyo (JP); Nobuhiro Fujinawa, Yokohama (JP); Akira Ohmura, Tokyo (JP)

(73) Assignee: Nikon Corporation, Tokyo (JP)

( * ) Notice: Subject to any disclaimer, the term of this patent is extended or adjusted under 35 U.S.C. 154(b) by 405 days.

(21) Appl. No.: 11/348,250

(22) Filed: Feb. 7, 2006

(65) Prior Publication Data

US 2006/0291851 A1    Dec. 28, 2006

(30) Foreign Application Priority Data

Feb. 8, 2005 (JP) ............................. 2005-031943
Sep. 6, 2005 (JP) ............................. 2005-257694

(51) Int. Cl.
    *G03B 19/00* (2006.01)
(52) U.S. Cl. .................. 396/430; 396/429; 352/68; 352/138; 352/139
(58) Field of Classification Search .......... 353/39, 353/71, 76; 352/68, 138–139, 166; 396/176, 396/177, 178, 429, 430; 348/774; 358/906, 358/909.1; 359/649
    See application file for complete search history.

(56) References Cited

U.S. PATENT DOCUMENTS

| 5,528,297 | A  | * | 6/1996  | Seegert et al.  | 348/333.1 |
| 5,606,420 | A  | * | 2/1997  | Maeda et al.    | 358/296   |
| 6,830,345 | B2 | * | 12/2004 | Kamm et al.     | 353/122   |
| 6,930,669 | B2 | * | 8/2005  | Weiner et al.   | 345/156   |
| 7,116,455 | B2 | * | 10/2006 | Yamaoka         | 359/204.4 |
| 7,188,958 | B2 | * | 3/2007  | Zoidis et al.   | 353/119   |
| 7,258,450 | B2 | * | 8/2007  | Koyama et al.   | 353/94    |
| 7,330,215 | B2 | * | 2/2008  | Ito             | 348/375   |
| 2001/0043279 | A1 | * | 11/2001 | Niikawa et al. | 348/335   |
| 2006/0017887 | A1 | * | 1/2006  | Jacobson et al. | 353/30    |
| 2006/0033819 | A1 | * | 2/2006  | Ozaki et al.    | 348/208.99 |
| 2007/0249396 | A1 | * | 10/2007 | Nitta et al.    | 455/556.1 |
| 2007/0263176 | A1 | * | 11/2007 | Nozaki et al.   | 353/69    |
| 2008/0001916 | A1 | * | 1/2008  | Nozaki et al.   | 345/156   |
| 2008/0049192 | A1 | * | 2/2008  | Nozaki et al.   | 353/25    |
| 2008/0259289 | A1 | * | 10/2008 | Nozaki et al.   | 353/70    |

FOREIGN PATENT DOCUMENTS

JP        8-146512      6/1996
JP     2002171428 A  *  6/2002

OTHER PUBLICATIONS

JP2002-171428 English Translation.*

* cited by examiner

*Primary Examiner*—Melissa J Koval
*Assistant Examiner*—Linda B Smith
(74) *Attorney, Agent, or Firm*—Staas & Halsey LLP

(57) ABSTRACT

A digital camera equipped with a projector, includes a photographing device; a projector device that projects an optical image; a mode switching operation member that outputs a switching operation signal indicating a changeover to one of a photographing operation mode in which image data photographed by the photographing device are saved as a photographic image file in a recording medium and a projection operation mode in which a reproduced image is projected by the projector device; a top surface operation member disposed at an upper surface of a casing; and a projection control device that controls the projector device based upon an operation signal provided by the top surface operation member upon receiving a switching operation signal indicating a changeover to the projection operation mode from the mode switching operation member.

10 Claims, 11 Drawing Sheets

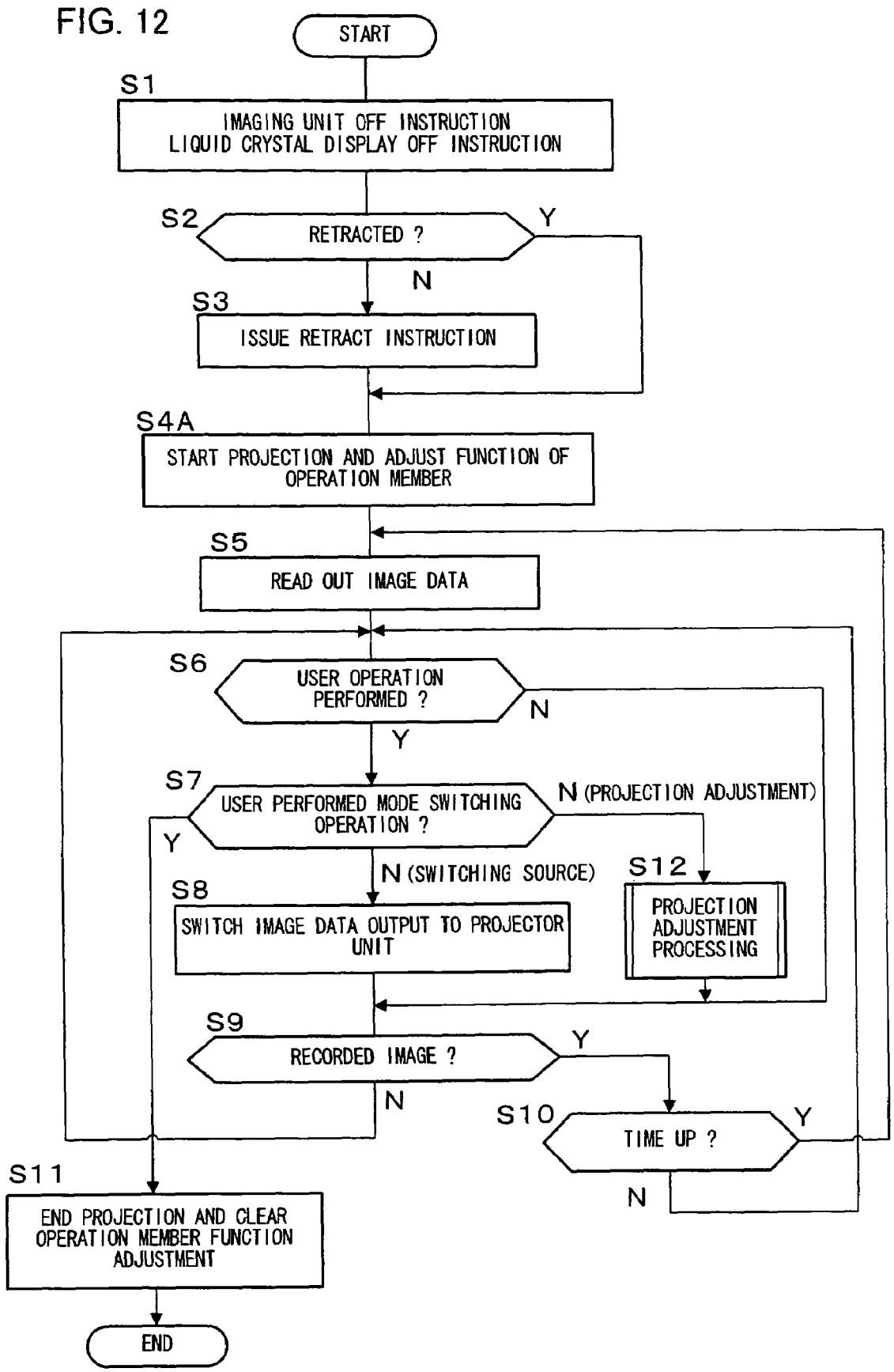

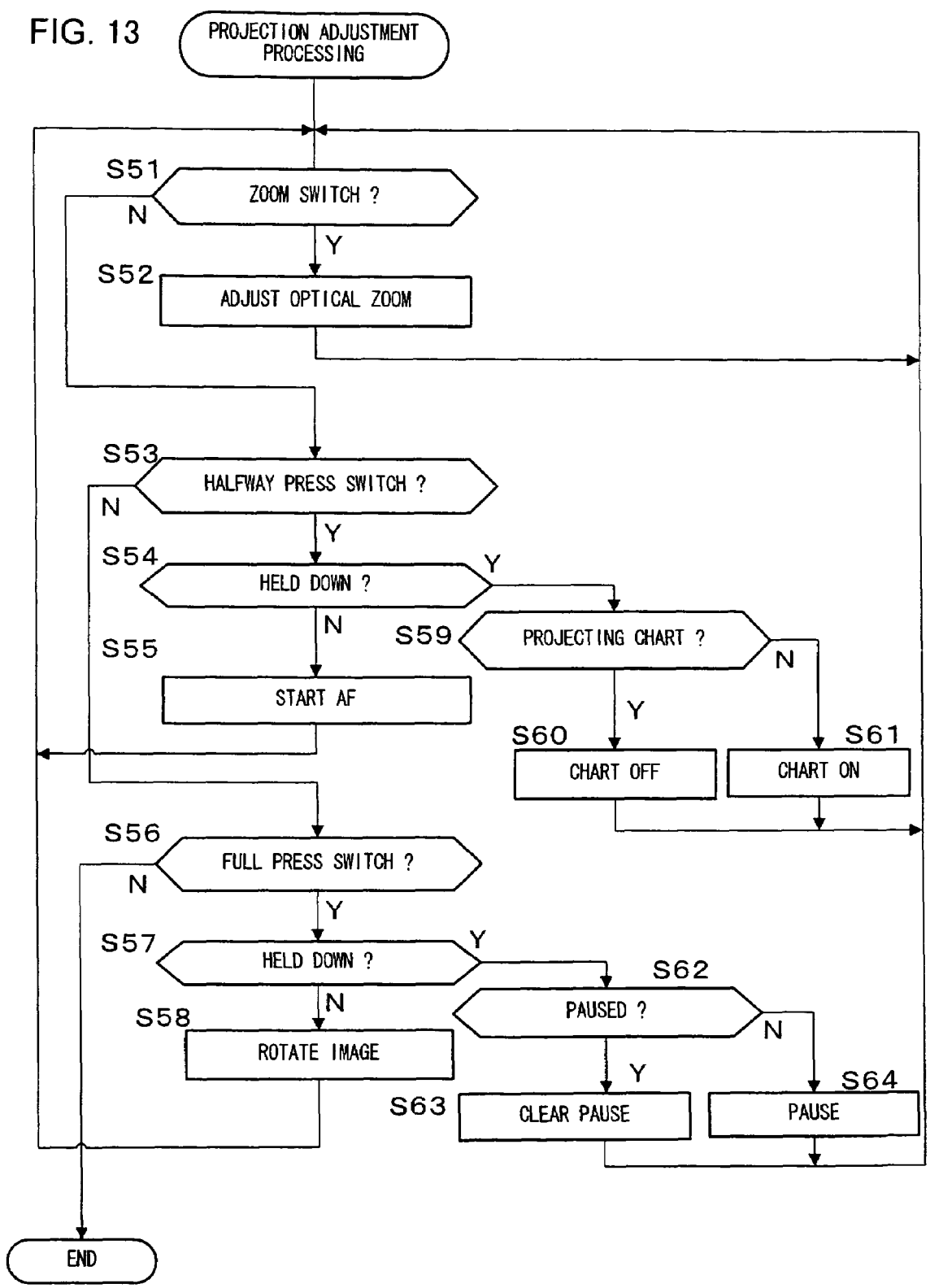

DIGITAL CAMERA WITH PROJECTOR AND DIGITAL CAMERA SYSTEM

INCORPORATION BY REFERENCE

The disclosures of the following priority applications are herein incorporated by reference:

Japanese Patent Application No. 2005-031943 filed Feb. 8, 2005

Japanese Patent Application No. 2005-257694 filed Sep. 6, 2005

BACKGROUND OF THE INVENTION

1. Field of the Invention

The present invention relates to a digital camera equipped with a projector that projects an optical image, and a digital camera system.

2. Description of Related Art

Japanese Laid Open Patent Publication No. H8-146512 discloses a composite camera equipped with a projector function. As a projection mode switch or a video play button is operated, the composite camera shifts into a mode in which the projector is engaged in operation.

However, after the composite camera disclosed in the publication is switched to the projection operation mode to engage the projector device in operation, further operations such as a selection of an image to be projected must be executed before the image is actually projected and thus, the camera does not assure the maximum operability.

SUMMARY OF THE INVENTION

A digital camera equipped with a projector according to a first aspect of the present invention includes a photographing device; a projector device that projects an optical image; a mode switching operation member that outputs a switching operation signal indicating a changeover to one of a photographing operation mode in which image data photographed by the photographing device are saved as a photographic image file in a recording medium and a projection operation mode in which a reproduced image is projected by the projector device; a top surface operation member disposed at an upper surface of a casing; and a projection control device that controls the projector device based upon an operation signal provided by the top surface operation member upon receiving a switching operation signal indicating a changeover to the projection operation mode from the mode switching operation member.

A digital camera equipped with a projector according to the first aspect may further include a photographing control device that controls the photographing device upon receiving a switching operation signal indicating a changeover to the photographing operation mode from the mode switching operation member, and it is preferable that the top surface operation member includes a shutter release operation member that outputs operation signals each corresponding to a halfway press operation mode or a full press operation mode; and the photographing control device controls the photographing device so as to execute photographing processing in correspondence to a signal indicating one of the halfway press operation mode and the full press operation mode provided by the shutter release operation member. The projection control device may issue one of a focus adjustment start instruction, a reproduced image projection instruction, a projection image rotation instruction and a projection pause instruction for the projector device based upon a signal indicating one of the halfway press operation mode and the full press operation mode provided by the shutter release operation member and a length of time over which the signal is sustained.

A digital camera equipped with a projector according to the first aspect may further include a photographing control device that controls the photographing device upon receiving a switching operation signal indicating a changeover to the photographing operation mode from the mode switching operation member, and it is preferable that the top surface operation member includes a selective operation member that selectively outputs one of various operation signals; the photographing control device controls the photographing device so as to execute zoom adjustment in correspondence to an operation signal provided by the selective operation member; and the projection control device controls the projector device so as to execute zoom adjustment in correspondence to an operation signal provided by the selective operation member. The photographing control device may control the photographing device so as to execute zoom adjustment in correspondence to an operation signal provided by the selective operation member; and the projection control device may control the projector device so as to execute focus adjustment in correspondence to an operation signal provided by the selective operation member. The photographing control device may control the photographing device so as to execute zoom adjustment in correspondence to an operation signal provided by the selective operation member; and the projection control device may control the projector device so as to forward or reverse a frame of a projection image in correspondence to an operation signal provided by the selective operation member. The photographing control device may control the photographing device so as to execute zoom adjustment in correspondence to an operation signal provided by the selective operation member; and the projection control device may control the projector device so as to execute keystone correction adjustment in correspondence to an operation signal provided by the selective operation member.

In a digital camera equipped with a projector according to the first aspect, upon receiving a switching operation signal indicating a changeover to the projection operation mode from the mode switching operation member, the projection control device may control the projector device so as to automatically reproduce and project in sequence a plurality of photographic image files saved in the recording medium after executing projection adjustment processing corresponding to an operation signal provided from the top surface operation member.

A digital camera equipped with a projector according to the first aspect may further include a retracting device that retracts a photographic optical system, and it is preferable that upon receiving a switching operation signal indicating a changeover to the projection operation mode from the mode switching operation member, the projection control device issues an instruction for the retracting device to retract the photographic optical system.

A digital camera system according to a second aspect of the present invention includes a photographing device; a top surface operation member disposed at an upper surface of a casing of a digital camera; a projector device that projects an optical image; and a projection control device that controls the projector device based upon an operation signal provided from the top surface operation member.

A digital camera system according to the second aspect may include the digital camera that includes the photographing device and the top surface operation member; and a digital camera auxiliary device that comprises the projector device, the projection control device and an interface device engaged in communication with the digital camera mounted at the digital camera auxiliary device, and it is preferable that upon detecting that the digital camera is mounted, the projection control device automatically sets the projector device in a projection-ready state and engages the projector device to sequentially project images reproduced based upon a plurality of photographic image files saved in a recording medium in the digital camera. As the digital camera is mounted, the digital camera auxiliary device may output an instruction signal for the digital camera to retract a photographic optical system.

A digital camera system according to the second aspect may include the digital camera that includes the photographing device and the top surface operation member; and a digital camera auxiliary device that comprises the projector device, the projection control device and an interface device engaged in communication with the digital camera electrically connected to the digital camera auxiliary device, and it is preferable that upon receiving a signal indicating that the digital camera is set in a reproduction mode, the projection control device automatically sets the projector device in a projection-ready state and engages the projector device to sequentially project images reproduced based upon a plurality of photographic image files saved in a recording medium in the digital camera.

A digital camera system according to the second aspect may include the digital camera that includes the photographing device, the top surface operation member, the projector device and the projection control device; and a digital camera auxiliary device that comprises an interface device used to at least either communicate with the digital camera mounted thereat or supply power to the digital camera mounted at the digital camera auxiliary device, and upon detecting that the digital camera is mounted at the digital camera auxiliary device, the projection control device may automatically engage the projector device to sequentially project images reproduced based upon a plurality of photographic image files saved in a recording medium.

A digital camera system according to the second aspect may include a digital camera auxiliary device that comprises an interface device used to at least either communicate with the digital camera mounted at the digital camera auxiliary device or to supply power to the digital camera mounted at the digital camera auxiliary device; and the digital camera that includes the photographing device, the top surface operation member, the projector device, the projection control device, a retracting device that retracts a photographic optical system and a retraction control device that issues an instruction for the retracting device to retract the photographic optical system upon detecting that the digital camera is mounted at the digital camera auxiliary device, and upon detecting that the digital camera is mounted at the digital camera auxiliary device, the projection control device may issue an instruction for the projector device to start projection.

In a digital camera equipped with a projector according to the first aspect, it is preferable that the top surface operation member includes a shutter release operation member that outputs operation signals each corresponding to a halfway press operation mode or a full press operation mode and a rotary selective operation member that selectively outputs one of various operation signals. A function adjustment device may be further provided that individually adjusts functions of the shutter release operation member and the selective operation member in response to a switching operation signal provided by the mode switching operation member.

A digital camera equipped with a projector according to the first aspect may further include a photographing control device that controls the photographing device upon receiving a switching operation signal indicating a changeover to the photographing operation mode from the mode switching operation member; and a side surface operation member disposed at a side surface of the casing, and it is preferable that the photographing control device controls the photographing device in response to operation signals provided by the top surface operation member and the side surface operation member.

BRIEF DESCRIPTION OF THE DRAWINGS

FIG. 12 presents a flowchart of program processing executed by a CPU in a projection mode; and FIG. 13 presents a detailed flowchart of the projection adjustment processing.

DESCRIPTION OF PREFERRED
EMBODIMENTS

The following is an explanation of the preferred embodiments for carrying out the present invention, given in reference to the drawings.

First Embodiment

Figure 1:
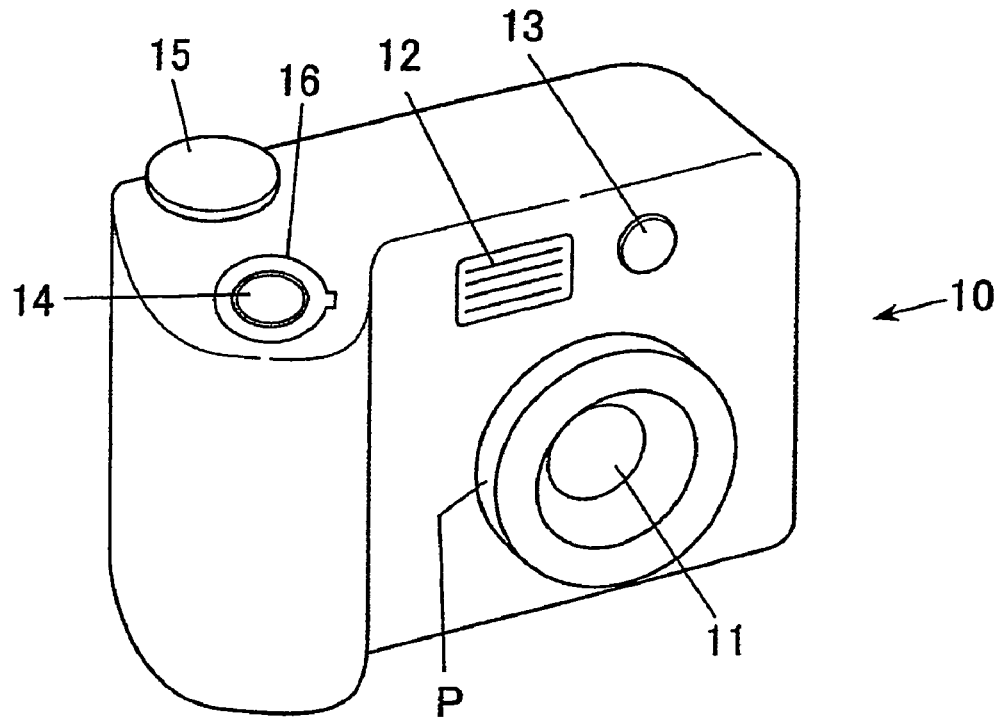
FIG. 1 is a perspective of a digital camera equipped with a projector achieved in a first embodiment of the present invention, viewed from the front side.

FIG. 1 is a perspective of a digital camera equipped with a projector, which is achieved in the first embodiment of the present invention, viewed from the front side of the digital camera (toward the subject). As shown in FIG. 1, a photographic lens 11, an illuminating light window 12 and a projection window 13 are disposed at the front of an digital camera 10 equipped with the projector. At the top surface (the surface of the casing turned to the upper side when the digital camera 10 is held sideways) of the digital camera 10 equipped with the projector, a shutter release button 14, a mode selector dial 15 and a main switch 16 are disposed.

Figure 2:
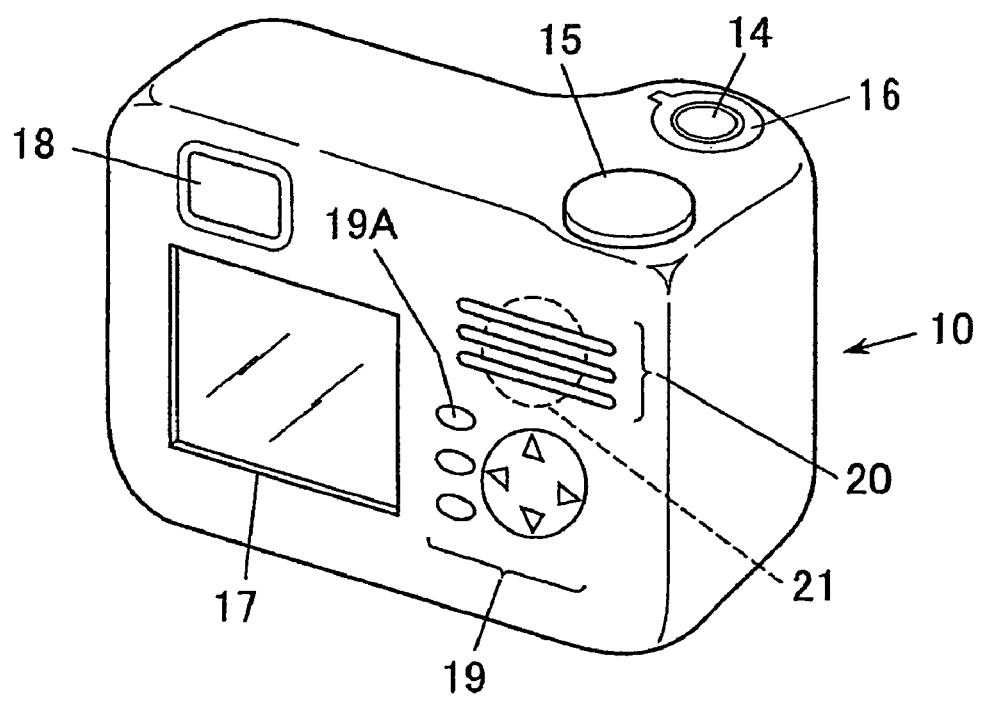
FIG. 2 is a perspective of the digital camera equipped with the projector in FIG. 1, viewed from the rear side.

FIG. 2 is a perspective of the digital camera equipped with the projector in FIG. 1, viewed from the rear side (toward the photographer). As shown in FIG. 2, a liquid crystal display unit 17, an electronic viewfinder 18, operation members 19 and speaker holes 20 are disposed at the rear surface of the digital camera 10 equipped with the projector. It is to be noted that the operation members 19 may be referred to as a side-surface operation member disposed at a surface (side surface) other than the top surface of the casing.

The digital camera 10 equipped with the projector includes a projector device (projector unit) to be detailed later. The projector device projects information such as images through the projection window 13 toward a screen or the like disposed to the front of the digital camera 10 equipped with the projector, which may be set on, for instance, a desk. In addition, the digital camera 10 equipped with the projector includes a built-in speaker 21 disposed behind the speaker holes 20 so as to reproduce information such as sound toward the rear of the digital camera 10.

The mode selector dial 15 is a mode switching operation member operated to switch the operation mode of the digital camera 10 equipped with the projector to a photographing mode, a projection mode or the like. In the photographing mode, a subject image is photographed and the photographic image data are saved into a recording medium constituted with a memory card or the like as a photographic image file. If a still image has been photographed, a still image file is generated, whereas if a dynamic image has been photographed, a dynamic image file is generated. In the photographing operation mode, the digital camera 10 equipped with the projector is most likely to be hand held by the photographer. An operation signal output in response to a depression of the shutter release button 14 is equivalent to a photographing start instruction. An illuminating device to be detailed later is mounted at the digital camera 10 equipped with the projector and light emitted from a light emitting member such as a xenon tube is output toward the front side of the digital camera 10 equipped with the projector through the illuminating light window 12. Audio data collected via a built-in microphone disposed together with the speaker 21 behind the speaker holes 20, too, can be saved into the recording medium in the photographing mode.

In the projection mode, an image reproduced by using image data that may have been obtained through a previous photographing operation and read out from a recording medium (e.g., a memory card 250 to be detailed later or an internal memory (not shown)) is projected by the projector unit through the projection window 13. The corresponding audio data are reproduced via the speaker 21 mentioned earlier in the projection mode. It is to be noted that an image reproduced by using image data read out from a source other than a recording medium or image data provided from a source outside the digital camera 10 equipped with the projector can also be projected in the projection mode.

The digital camera 10 equipped with the projector includes a retracting mechanism for retracting a lens barrel P into the camera casing so as to ensure that light projected through the projection window 13 does not become eclipsed at the lens barrel P of the photographic lens 11.

Figure 3:
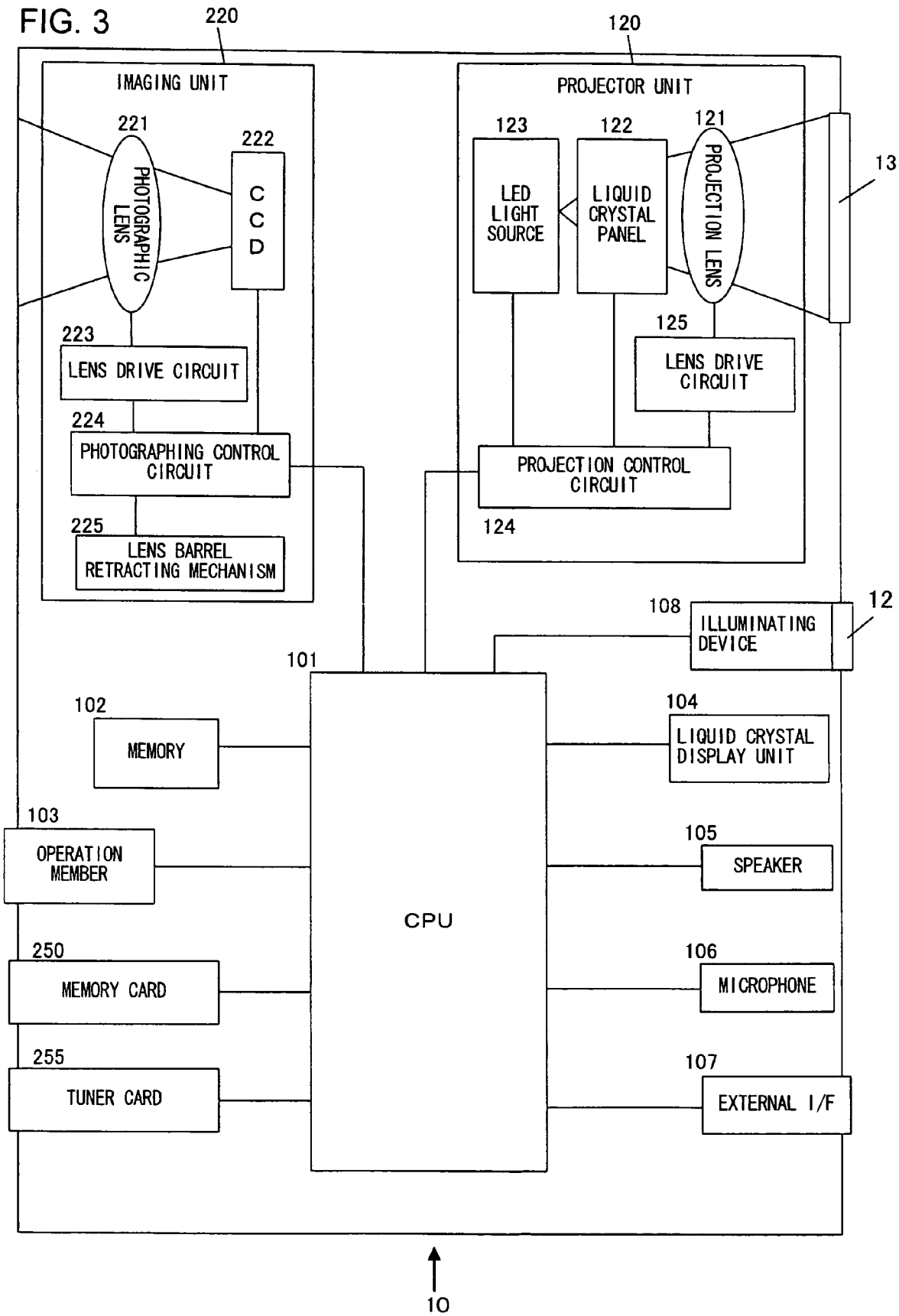
FIG. 3 is a block diagram of the structure adopted in the digital camera equipped with the projector.

FIG. 3 is a block diagram of the structure adopted in the digital camera 10 equipped with the projector described above. As shown in FIG. 3, the digital camera 10 equipped with the projector includes a projector unit 120, an imaging unit 220, a CPU 101, a memory 102, an operation member 103, a liquid crystal display unit 104, a speaker 105, a microphone 106, an external interface (I/F) 107 and an illuminating device 108. A memory card 250 and an optional tuner card 255 are loaded in card slots (not shown). These cards can be loaded/unloaded freely.

The CPU 101 controls the photographing operation and the projection operation based upon a control program by executing specific arithmetic operations based upon signals input from the individual units constituting the digital camera 10 equipped with the projector and providing the resulting control signals to the various units of the digital camera 10 equipped with the projector. It is to be noted that the control program is stored in a nonvolatile memory (not shown) within the CPU 101.

The memory 102 is utilized as a work area by the CPU 101. The operation member 103 corresponds to the main switch 16, the shutter release button 14 and the mode selector dial 15 in FIG. 1 and also corresponds to the operation members 19 in FIG. 2. Operation signals corresponding to specific operation details are transmitted from the operation member 103 to the CPU 101.

The memory card 250 is constituted with a nonvolatile memory such as a flash memory, and data such as image data obtained by the imaging unit 220 through a photographing operation can be written and saved into the memory card 250 or such image data can be read out from the memory card 250 in response to a command issued by the CPU 101. The tuner card 255 receives and modulates television broadcast signals and the image data and the audio data having undergone the modulation process are then output to the CPU 101.

The illuminating device 108 engages the light emission member in light emission in response to a light emission instruction output by the CPU 101 and radiates illuminating light to be used to illuminate the subject toward the area out in front of the digital camera 10 equipped with the projector through the illuminating light window 12.

At the liquid crystal display unit 104 (which corresponds to reference numeral 17 in FIG. 2), information such as an image or text is displayed in response to a command issued by the CPU 101. The text information displayed at the liquid crystal display unit 104 may indicate the operating state of the digital camera 10 equipped with the projector, or it may be an operation menu or the like. Sound is reproduced through the speaker 105 (corresponds to reference numeral 21 in FIG. 2) by using audio data output by the CPU 101.

The microphone 106 converts sound having been collected to electrical signals and outputs the electrical signals to the CPU 101. The audio signal data are recorded into the memory card 250 in the photographing mode.

In order to enable the liquid crystal display unit 104 to display an image reproduced based upon video signals transmitted from an external apparatus such as a video camera or enable the projector unit 120 to project the reproduced image, the video signals are converted to image data and the image data resulting from the conversion are output to the CPU 101 via the external interface (I/F) 107. In addition, the external interface (I/F) 107 converts sound constituted with audio signals transmitted from an external apparatus to audio data for audio reproduction at the speaker 105 and outputs the audio data resulting from the conversion to the CPU 101.

(Projector Unit)

The projector unit 120 includes a projection lens 121, a liquid crystal panel 122, an LED light source 123, a projection control circuit 124 and a lens drive circuit 125. The projection control circuit 124 supplies a drive current to the LED light source 123 in response to a projection command output by the CPU 101. The LED light source 123 illuminates the liquid crystal panel 122 with a brightness that corresponds to the supplied current.

In addition, the projection control circuit 124 generates a liquid crystal panel drive signal in correspondence to image data output from the CPU 101 and drives the liquid crystal panel 122 with the drive signals thus generated. More specifically, a voltage corresponding to the image signal is applied to each of the pixels at the liquid crystal layer. The voltage applied to the liquid crystal layer alters the liquid crystal molecular arrangement thereby changing the light transmittance at the liquid crystal layer. By modulating the light from the LED light source 123 in correspondence to the image signal as described above, an optical image is generated through the liquid crystal panel 122.

Based upon a control signal output from the projection control circuit 124, the lens drive circuit 125 drives the projection lens 121 forward/backward along the direction perpendicular to the optical axis. The optical image emitted from the liquid crystal panel 122 is projected toward a screen or the like through the projection lens 121. It is to be noted that the projection adjustment processing for adjusting the offset, the focus and the like of the projection image is to be explained in detail in reference to a fourth embodiment.

In response to a command issued by the CPU 101, the projector unit 120 projects an image (content) corresponding to a specific source among (source 1) through (source 4) described below. The CPU 101 outputs image data to be used to project an image corresponding to a specific source so that each time an operation signal is input from a projection changeover switch (such as that indicated by reference numeral 19A in FIG. 2) constituting the operation member 103, the image projection is switched cyclically to project images corresponding to sources (1) through (4) in the order of (1)->(2)->(3)->(4)->(1) . . . . However, the source (1) is skipped if the memory card 250 is not loaded in the digital camera 10 equipped with the projector and the source (2) is skipped if the tuner card 255 is not loaded. In addition, the source (4) is skipped if no external apparatus is connected to the external interface (I/F) 107.

(1) An image reproduced based upon image data recorded in the memory card 250

(2) A broadcast image received and modulated at the tuner card 255

(3) An image reproduced based upon image data recorded in the internal memory (such as a nonvolatile memory within the CPU 101)

(4) An image reproduced based upon video signals input through the external interface (I/F) 107.

When an image corresponding to the source (1) or the source (3) is to be projected, the CPU 101 reads out the image data corresponding to the most recent recording date (the image data most recently photographed among the recorded image data) from the memory card 250 (or the internal memory) and outputs the image data thus read out to the projector unit 120.

When a mode for reproducing a single-frame still image is selected for the projector unit 120 and an image corresponding to the source (1) or the source (3) is currently projected, the CPU 101 reads out the image data in the frame immediately preceding the frame of the currently projection image from the memory card 250 (or the internal memory) and outputs the image data to the projector unit 120 in response to an operation signal (e.g., a leftward operation on a cross-shaped key) input thereto from a reverse switch constituting the operation member 103. As a result, the image in the frame immediately preceding the currently projection image is projected by the projector unit 120, replacing the initial projection image.

When an image corresponding to the source (1) or the source (3) is currently projected, the CPU 101 reads out the image data in the frame immediately following the frame of the currently projection image from the memory card 250 (or the internal memory) and outputs the image data to the projector unit 120 in response to an operation signal (e.g., a rightward operation on the cross-shaped key) input thereto from a forward switch constituting the operation member 103. As a result, the image in the frame immediately following the currently projection image is projected by the projector unit 120, replacing the initial projection image. By disposing the forward switch and the reverse switch at the top surface of the digital camera 10 equipped with the projector, the extent of camera movement attributable to an operation of either switch is reduced and thus, the likelihood of a significant displacement of the projection image is reduced as well.

(Imaging Unit)

The imaging unit 220 includes a photographic lens 221 (corresponds to reference numeral 11 in FIG. 1), an image sensor 222, a lens drive circuit 223, a photographing control circuit 224 and a lens barrel retracting mechanism 225. The image sensor 222 may be a CCD or CMOS imaging element. The photographing control circuit 224 controls the drive of the image sensor 222 and the lens drive circuit 223 based upon commands issued by the CPU 101 and executes specific types of image processing on imaging signals (electrical charge storage signals) output from the image sensor 222. The image processing includes white balance processing and gamma processing.

Upon receiving a zoom control signal provided by the photographing control circuit 224, the lens drive circuit 223 drives the zoom lens (not shown), which constitutes the photographic lens 221, toward the telephoto side or the wide-angle side, as indicated by the control signal. The photographic lens 221 forms a subject image onto the imaging surface of the image sensor 222. The photographing control circuit 224 engages the image sensor 222 to start an imaging operation, reads out the electrical charge storage signals from the image sensor 222 once the imaging operation is completed and outputs the image data resulting from the image processing described above to the CPU 101.

In addition, in response to a command issued by the CPU 101, the photographing control circuit 224 outputs a command to the lens barrel retracting mechanism 225 so as to retract the lens barrel P (see FIG. 1) of the photographic lens 221 into the casing of the digital camera 10 equipped with the projector or extend the lens barrel P currently retracted in the casing to the photographing position (see FIG. 1).

Since the present invention is characterized by the operations executed when the projection mode is selected in the digital camera 10 equipped with the projector, the following explanation focuses on the control executed by the CPU 101 as the projection mode is selected.

Figure 4:
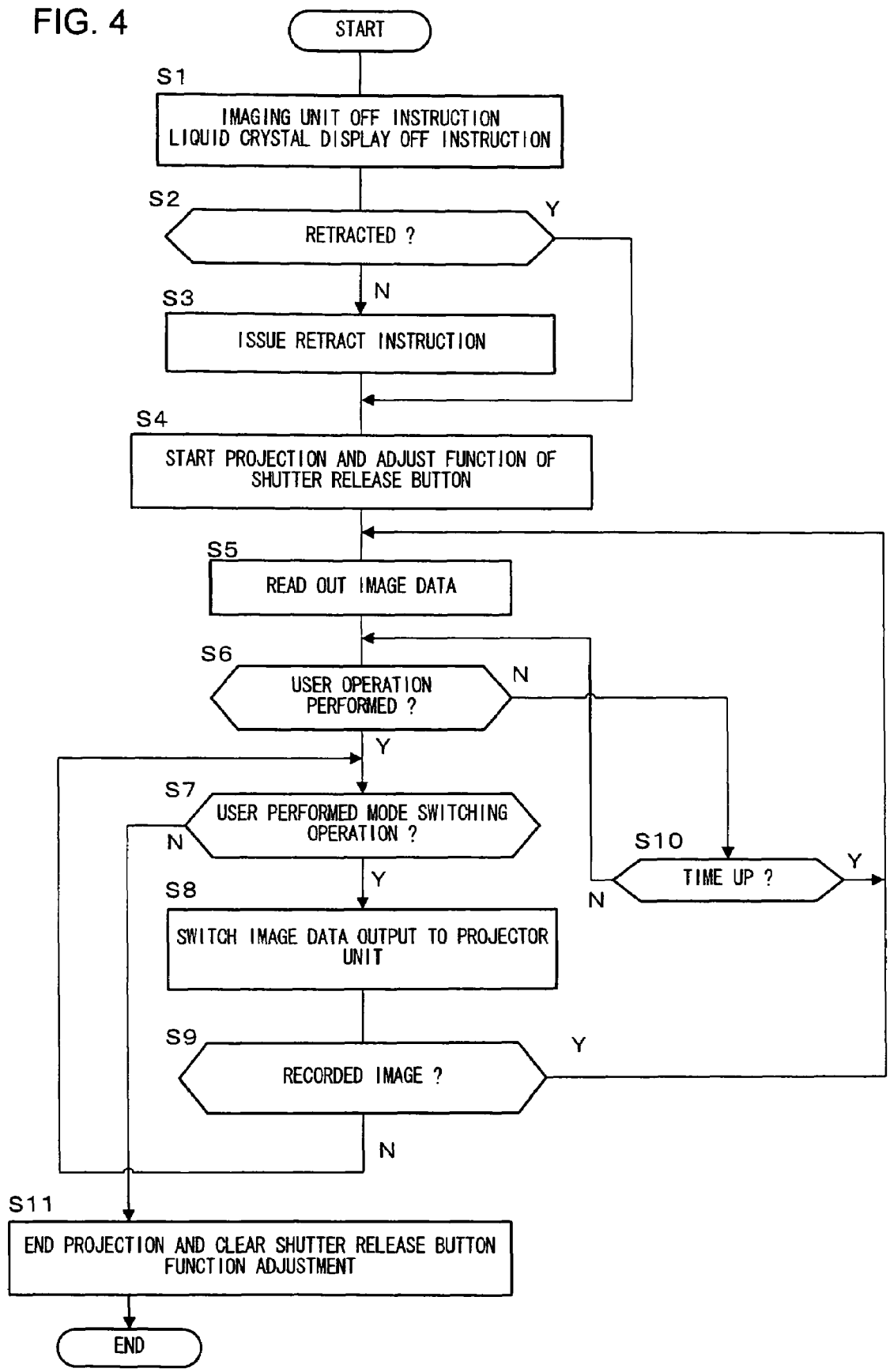
FIG. 4 presents a flowchart of program processing executed by a CPU in a projection mode.

FIG. 4 presents a flowchart of the processing executed in conformance to the program by the CPU 101 of the digital camera 10 equipped with the projector in the projection mode. The processing shown in FIG. 4 starts as an operation signal indicating a changeover to the projection mode is input to the CPU 101 from the mode selector dial 15.

In step S1 in FIG. 4, the CPU 101 outputs an imaging unit OFF instruction to the photographing control circuit 224 and also issues a display OFF instruction for the liquid crystal display unit 104 before the operation proceeds to step S2. As a result, the imaging operation at the imaging unit 220 stops and the display at the liquid crystal display unit 104 is turned off.

In step S2, the CPU 101 makes a decision as to whether or not the lens barrel P is currently in a retracted state. If a signal indicating a retracted state is received from the photographing control circuit 224, the CPU 101 makes an affirmative decision in step S2 to proceed to step S4, whereas it makes a negative decision in step S2 if a signal indicating a non-retracted state is received to proceed to step S3.

The CPU 101 outputs a retract command (instruction) to the photographing control circuit 224 in step S3, and then the operation proceeds to step S4. In step S4, the CPU 101 issues a projection start instruction to the projection control circuit 124 and also effects a functional adjustment for the shutter release button 14 (see FIG. 1), before the operation proceeds to step S5. In response, the LED light source 123 is turned on at the projector unit 120.

After the function adjustment is effected by the CPU 101 in step S4, the shutter release button 14 functions as an operation member for rotating the orientation of the projection image instead of the operation member through which photographing instructions are issued, until the function adjustment for the shutter release button 14 (see FIG. 1) is cleared in step S11 as detailed later.

Figure 5:
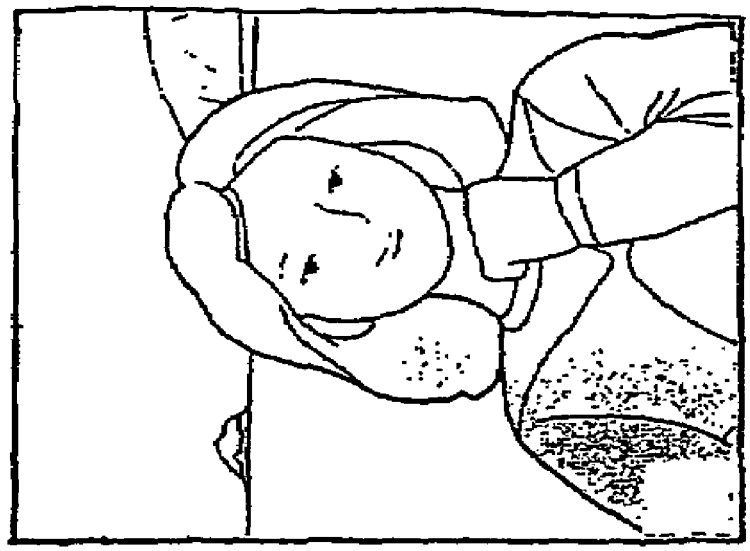
FIG. 5 presents an example of projection of a laterally oriented image.

The projection image is rotated as explained below. FIG. 5 present an example of a laterally oriented projection image. If a photographic image photographed with the digital camera 10 equipped with the projector held upright (vertically) is projected by setting the digital camera 10 equipped with the projector sideways (horizontally as shown in FIGS. 1 and 2), the reproduced image is projected with the lateral orientation, as shown in FIG. 5.

Figure 6:
FIG. 6 shows a projection image having undergone rotation processing and reduction processing.

In response to an operation signal input thereto from the shutter release button 14 while an image is projected, the CPU 101 rotates the image data in the memory 102 by, for instance, 90° in the clockwise direction and outputs the image data having undergone the rotation processing to the projector unit 120. It is to be noted that the CPU 101 also executes size conversion processing in correspondence to the aspect ratio of the projection image so that the image having undergone the rotation processing is contained in the projection range of the projector unit 120. For instance, assuming the aspect ratio of the projection image in FIG. 5 is 4 (lateral):3 (longitudinal), the CPU 101 executes data size reduction processing so as to express the image resulting from the rotation processing with pixels, the numbers of which are reduced to ¾ of the initial numbers of pixels both along the longitudinal direction and the lateral direction. As a result, an image having undergone both the rotation processing and the reduction processing is projected, as shown in FIG. 6.

The CPU 101 repeatedly executes the size conversion processing and the rotation processing described above each time an operation signal is input from the shutter release button 14. As the size conversion processing, reduction processing for reducing the numbers of pixels along the longitudinal and the lateral directions both by a factor of ¾ and enlargement processing for increasing the numbers of pixels along the longitudinal direction and the lateral direction by a factor of 4/3 are alternately executed in correspondence to the aspect ratio mentioned earlier. Accordingly, if the shutter release button 14 is operated four times in a row, the projection image rotates a full cycle in the clockwise direction and after the fourth operation of the shutter release button 14, the size of the projection image is reset to the size it assumed before the shutter release button 14 was operated.

In step S5 in FIG. 4, the CPU 101 reads out the image data with the most recent recording date from the memory card 250 and outputs the image data thus read out to the projector unit 120 before the operation proceeds to step S6. Thus, an image reproduced by using the image data output by the CPU 101 to the projector unit 120 is projected. It is to be noted that while image data are read out from the memory card 250 at the default setting, the default setting may be modified so as to read out image data from the internal memory at the CPU 101.

It is also to be noted that if audio data are stored in correspondence to the data file of the currently projection image, the CPU 101 reproduces sound through the speaker 105 by using the audio data. The stored image data may contain both still image data files and dynamic image data files.

In step S6, the CPU 101 makes a decision as to whether or not a user operation has been performed. The CPU 101 makes an affirmative decision in step S6 if an operation signal has been input through the operation member 103 (see FIG. 3) to proceed to step S7, whereas it makes a negative decision in step S6 if no operation signal has been input through the operation member 103 to proceed to step S10.

In step S10, the CPU 101 makes a decision as to whether or not the time is up. If a specific length of time (e.g., 5 seconds) has been counted on an internal timer, the CPU 101 makes an affirmative decision in step S10 to return to step S5. If, on the other hand, the specific length of time has not elapsed, a negative decision is made in step S10 to return to step S6.

The operation returns to step S5 to execute a slide-show projection. Namely, an image reproduced by using image data read out from the memory card 250 (or the internal memory) is projected. After 5 seconds elapses, the next image data are read out from the memory card 250 (or the internal memory) and the image projection is updated with the image reproduced by using the most recently read-out image data. It is to be noted that the length of the projection time per image during the slide-show projection is not necessarily 5 seconds, and the length of the projection time can be adjusted as desired.

In step S7, the CPU 101 makes a decision as to whether or not the user operation is a mode switching operation. The CPU 101 makes an affirmative decision in step S7 if the user has operated the projection changeover switch 19A (see FIG. 2) to proceed to step S8, whereas it makes a negative decision in step S7 if the user has performed a projection mode end operation instead of operating the projection changeover switch 19A (see FIG. 2) to proceed to step S11.

In step S8, the CPU 101 switches the source of the image data to be output to the projector unit 120 by one setting so that the sources are switched in the order of; (source 1)-> (source 2)->(source 3)->(source 4)->(source 1) . . . , and then the operation proceeds to step S9. In step S9, the CPU 101 makes a decision as to whether or not the image data to be output to the projector unit 120 originate from either the source (1) or the source (3) (i.e., whether or not a recorded image is to be output to the projector unit 120). The CPU 101 makes an affirmative decision in step S9 if the image data to be output to the projector unit 120 are a recorded image and, in this case, the operation returns to step S5. However, it makes a negative decision in step S9 if the image data to be output to the projector unit 120 are an image from either the source (2) or the source (4), e.g., an unrecorded image, to return to step S7.

In step S11, the CPU 101 issues a projection end instruction to the projection control circuit 124 and clears the function adjustment at the shutter release button 14 (see FIG. 1), thereby ending the processing in FIG. 4. As the processing ends, the LED light source 123 at the projector unit 120 goes off.

The following operational effects can be achieved in the first embodiment described above.

(a) As the projection mode is selected in the digital camera 10 equipped with the projector, the lens barrel P (see FIG. 1) of the photographic lens 11 (221) is retracted into the casing (step S3). Since the lens barrel P thus moves out of the range of the angle of projection field of the light projected by the projector unit 120, a full projection image is obtained.

(b) As the projection mode is selected in the digital camera 10 equipped with the projector, the function of the shutter release button 14 is altered so as to allow the shutter release button 14 to function as an operation member operated to rotate the orientation of the projection image (step S4). As an operation signal is input from the shutter release button 14, the digital camera 10 equipped with the projector first rotates the image data by 90° in the clockwise direction in the memory 102, executes the size conversion processing in correspondence to the aspect ratio of the projection image so as to ensure that the image having undergone the rotation processing is contained within the range of the projection by the projector unit 120 and projects the resulting image through the projector unit 120. Accordingly, even when the projection contents include both laterally (horizontally) oriented images and longitudinally (vertically) oriented images, an upright projection image is obtained at all times simply by pressing down the shutter release button 14 without having to adjust the direction along which the digital camera 10 equipped with the projector is set, in correspondence to each set of contents. It is to be noted that the projection image may be rotated along the counterclockwise direction instead. Since the projection image is made to rotate via a switch (the shutter release button 14) disposed at the top surface of the camera 10, the projection image can be rotated without having to hold the camera by hand during a projection operation. In other words, the projection image is rotated without using a switch disposed at a surface (e.g., the rear surface) other than the top surface of the camera, and thus, the camera is less likely to move while the rotation operation member is operated, which, in turn, reduces the likelihood of the projection image displacement.

(c) As the projection mode is selected in the digital camera 10 equipped with the projector, it automatically projects images reproduced by using image data recorded in the memory card 250 in a slide-show (steps S4 through S10). This means that after the camera is set in the projection mode, the user does not need to turn on the projection lamp (the LED light source 123) or select an image to be projected. As a result, a higher level of operability of the digital camera 10 equipped with the projector is assured in the projection mode.

(d) As an operation signal is input from the projection changeover switch 19A (see FIG. 2), while an image is projected in the projection mode, the digital camera 10 equipped with the projector cyclically switches the projection images so as to project an image originating from a specific source among the sources (1) through (4). Thus, a reproduced image can be projected via the projector unit 120 regardless of the format of the image data or the image signals input to the digital camera 10 equipped with the projector. In addition, the image to be projected can be selected through a simple operation.

In the example explained above, image data recorded in the memory card 250 are selected and images reproduced by using the selected image data are automatically projected in a slide-show when the digital camera 10 equipped with the projector is set to the projection mode. More specifically, when the processing in step S5 in FIG. 4 is executed for the first time, image data are read out from the memory card 250. Alternatively, images reproduced by using image data recorded in the internal memory corresponding to the source (3) may be projected.

In addition, when the projection mode is selected in the digital camera 10 equipped with the projector, an image corresponding to either the source (2) or the source (4) may be selected and projected instead.

Second Embodiment

The present invention may also be adopted in a system in which a rechargeable battery is used as a power source in a digital camera and a projector device is built into a digital camera auxiliary device that supplies the electrical current to the digital camera to charge the rechargeable battery. The digital camera auxiliary device is constituted as a cradle through which the charging current (power) may be supplied to the digital camera and which may project a reproduced image. Under normal circumstances, a photographing operation is not performed while the digital camera is mounted at the cradle.

Figure 7:
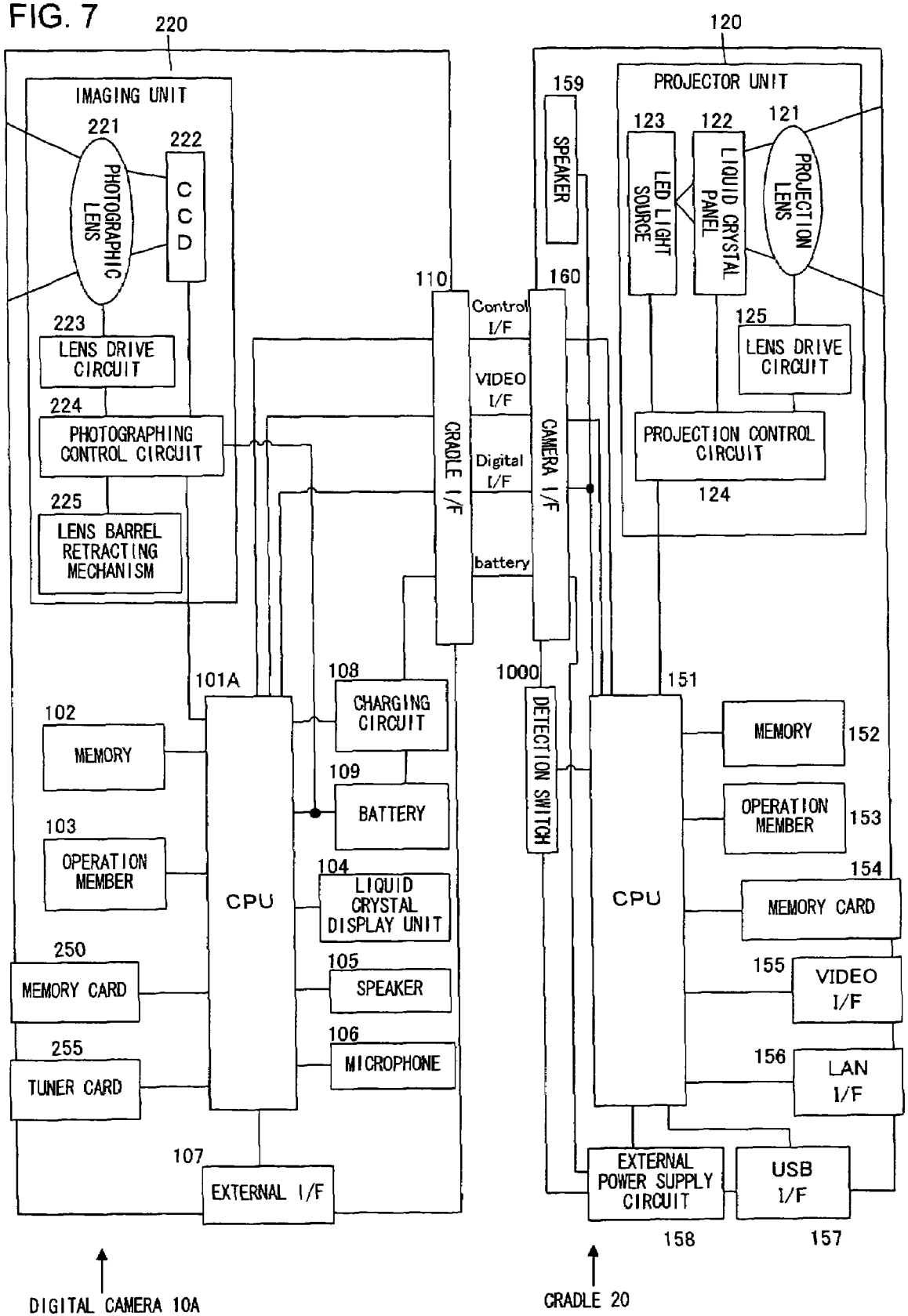
FIG. 7 is a block diagram of the structure adopted in a digital camera system achieved in a second embodiment.

FIG. 7 is a block diagram of a digital camera 10 constituting the digital camera system mounted at a cradle 20.

(Cradle)

The cradle 20 in FIG. 7 includes a projector unit 120, a CPU 151, a memory 152, an operation member 153, a video interface (VIDEO I/F) 155, a LAN interface (LAN I/F) 156, a USB interface (USB I/F) 157, an external power source circuit 158, a camera interface 160 and a speaker 159. A detachable memory card 154 is loaded in a memory slot (not shown) formed at the casing of the cradle 20.

The CPU 151 controls the communication operation and the projector operation by executing specific arithmetic operations on signals input from the individual units constituting the cradle 20 and providing the resulting control signals to the various units of the cradle 20 based upon a cradle control program. It is to be noted that the cradle control program is stored in a nonvolatile memory (not shown) within the CPU 151.

The memory 152 is utilized as a work memory by the CPU 151. At the memory card 154 constituted with a nonvolatile memory such as a flash memory, data can be written, saved and read out in response to commands issued by the CPU 151.

The video interface (VIDEO I/F) 155 generates video signals to be used to display at an external television monitor or the like an image reproduced by using image data or video signals transmitted from the digital camera 10A via the camera interface 160 when the digital camera 10A is set on the cradle 20 or an image reproduced by image data read out from the memory card 154 when the digital camera 10A is not set on the cradle 20. The reproduced image is displayed at the external television monitor or the like connected with the video interface (VIDEO I/F) 155.

In response to a command issued by the CPU 151, the LAN interface (LAN I/F) 156 engages in data exchange with another external apparatus (e.g., a DVD recording/reproducing apparatus, a security camera or the like) connected thereto via a LAN cable (not shown). The USB interface (USB I/F) 157 engages in data exchange with another external apparatus (e.g., a personal computer, a printer or a photo data storage device) connected thereto via a USB cable (not shown) in response to a command issued by the CPU 151.

The external power source circuit 158, constituted with an AC/DC conversion circuit or the like, converts an AC voltage input via a power cable (not shown) to a DC voltage required by the various units within the cradle 20 and supplies the voltage resulting from the conversion to the various blocks. In addition, the external power source circuit 158 supplies the digital camera 10A with a charging current to be used to charge the rechargeable battery in the digital camera 10A via the camera interface 160.

When the digital camera 10A is set on the cradle 20, the camera interface 160 engages in data communication with the digital camera 10A or supplies the charging current to the digital camera 10A in response to a command from the CPU 151. The camera interface 160 includes a control interface (Control I/F) line through which control signals are exchanged, a video interface (VIDEO I/F) line through which video signals are exchanged, a digital interface (Digital I/F) line through which image data and audio data (digital signals) are exchanged and a power line through which the charging current is supplied.

In response to a command issued by the CPU 151, sound is reproduced through the speaker 159 by using audio data output from the CPU 151 or transmitted from the digital camera 10A via the camera interface 160. The operation member 153 outputs an operation signal corresponding to a specific switch having been operated to the CPU 151.

Since the projector unit 120 assumes a structure similar to that shown in FIG. 3, its explanation is omitted. The projector unit 120 starts a projection operation upon receiving a projection command output from the CPU 151 in response to a projection start operation signal input to the CPU 151 from the operation member 153 or a projection start instruction signal input to the CPU 151 from the digital camera 10A via the camera interface 160.

In response to a command from the CPU 151, an image originating from a specific source among sources (1) through (3) described below is projected via the projector unit 120.

(1) An image reproduced by using image data originating from the memory card 250 or the internal memory (not shown) in the digital camera 10A transmitted from the digital interface (Digital I/F) line at the camera interface 160

(2) An image reproduced by using video signals transmitted from the digital camera 10A via the video interface (VIDEO I/F) line at the camera interface 160.

(3) An image reproduced by using image data recorded in the memory card 154 at the cradle 20.

(Electronic Camera)

The digital camera 10A in FIG. 7 includes an imaging unit 220, a CPU 101A, a memory 102, an operation member 103, an external interface (I/F) 107, a microphone 106, a speaker 105, a liquid crystal display unit 104, a battery 109, a charging circuit 108 and a cradle interface 110. The memory card 250 and the tuner card 255 are loaded and unloaded at memory slots (not shown), as necessary. The external structure of the digital camera 10A is similar to that of the digital camera 10 in FIGS. 1 and 2 and it adopts a structure that allows the cradle interface 110 to be exposed to the outside as necessary. However, it does not include a projector unit and accordingly, it is not equipped with a projection window 13 either. The same reference numerals are assigned to blocks constituting the digital camera 10A that are similar to the blocks in the structure shown in FIG. 3 to preclude the necessity for a repeated explanation thereof.

The CPU 101A controls the camera operations by executing specific arithmetic operations on signals input from the individual units constituting the digital camera 10A and providing the resulting control signals to the various units of the digital camera 10A based upon a camera control program. It is to be noted that the camera control program is stored in a nonvolatile memory (not shown) within the CPU 101A.

The battery 109 is a rechargeable battery that supplies power to various units where power is required in the digital camera 10A. The charging circuit 108 charges the battery 109 with the charging current supplied from the cradle 20 via the cradle interface 110.

The cradle interface 110 engages in data communication with the cradle 20 and/or receives the charging current from the cradle while the digital camera 10A is mounted at the cradle 20. The cradle interface 110 includes a control interface (Control I/F) line through which control signals are exchanged, a video interface (VIDEO I/F) line through which video signals are exchanged, a digital interface (Digital I/F) line through which image data and audio data are exchanged and a power line through which the charging current is supplied.

Video signals are generated by the CPU 101A to display an image, menu information or the like at the liquid crystal display unit 104. Image data obtained at the imaging unit 220 can be recorded into the memory card 250 or transmitted to the cradle 20 via the cradle interface 110. Audio data collected at the microphone 106, too, can be recorded into the memory card 250 or transmitted to the cradle 20 via the cradle interface 110 together with the image data.

The operation modes of the digital camera 10A include a photographing mode and a reproduction operation mode for reproducing images by using photographic image data. Since the digital camera is not equipped with a projector unit, a projection mode does not need to be available. The digital camera 10A is switched from a given operation mode to another in response to an operation of the mode selector dial 15 at the operation member 103.

As the digital camera 10A mounted at the cradle 20 is switched to the reproduction operation mode in the digital camera system described above, the CPU 101A of the digital camera 10A sets the projector unit 120 at the cradle 20 in an operation-enabled state (by supplying power and turning on the LED light source 123 to enter a projection-ready state). The CPU 101A also transmits a projection start instruction signal to the cradle 20 via the cradle interface 110. In response, the CPU 151 at the cradle 20 engages the projector unit 120 to sequentially project a plurality of reproduced images originating from the source (1) described above (images reproduced by using image data corresponding to a plurality of image files stored in the memory card 250 or the internal memory (not shown) at the digital camera 10A) in a slide-show. It is to be noted that the image data used for the image reproduction may include both still images and dynamic images. Alternatively, reproduced images originating from the source (2) or the source (3) may be projected in a slide-show. As a further alternative, instead of sequentially projecting a plurality of reproduced images in a slide-show, a specific image (e.g., the image most recently photographed with the digital camera 10A) stored in the memory card 250 or the internal memory (not shown) at the digital camera 10A may be projected.

While the digital camera 10A is set on the cradle 20 which is used to charge the battery 109 in the digital camera 10A and also includes the projector unit 120 for projecting reproduced images in the explanation given above, the present invention may also be adopted in a system in which the digital camera 10A is connected to a projection display device instead of the cradle 20, which is equipped with the projector unit 120 but does not include a charging circuit.

As the operation mode of the cradle 20 is switched from a charge mode for supplying the charging current to the digital camera 10A to a projection mode for projecting a reproduced image via the projector unit 120, the CPU 151 at the cradle 20 transmits a signal constituting an instruction to retract the lens barrel P (see FIG. 1) to the digital camera 10A via the camera interface 160 at the projection start. In response, the CPU 101A at the digital camera 10A outputs a retract command (instruction) to the photographing control circuit 224 so as to retract the lens barrel P.

The cradle 20 may adopt a structure that allows it to concurrently charge the battery 109 built into the digital camera 10A and project images via the projector unit 120. In addition, the projector unit 120 may be driven on power supplied by the external power source circuit 158 instead of the battery 109 built into the digital camera 10A to reduce the power consumption at the battery 109.

(Variation 1)

The cradle 20 may automatically shift from the charge mode to the projection mode once the battery 109 in the digital camera 10A becomes fully charged. In such a case, upon receiving a signal indicating a charge end provided by the CPU 101A of the digital camera 10A, the CPU 151 should transmit to the digital camera 10A a signal instructing that the lens barrel P (see FIG. 1) be retracted and should also sequentially project a plurality of reproduced images originating from the source (1) in a slide-show via the projector unit 120. Alternatively, it may project reproduced images corresponding to the source (2) or the source (3) in a slide-show. As a further alternative, instead of sequentially projecting a plurality of reproduced images in a slide-show, a specific image (e.g., the image most recently photographed with the digital camera 10A) stored in the memory card 250 or the internal memory (not shown) at the digital camera 10A may be projected.

(Variation 2)

Alternatively, the cradle 20 may automatically shift into the projection mode as the digital camera 10A is placed on the cradle 20. For instance, the signal level at a specific terminal within the camera interface 160 may be detected over predetermined time intervals and a decision may be made as to whether or not the digital camera 10A is currently set on the cradle 20 based upon the detected signal value. In such a case, upon detecting that the digital camera 10A is currently set on the cradle 20, the CPU 151 should transmit to the digital camera 10A a signal instructing that the lens barrel P (see FIG. 1) be retracted, set the projector unit 120 in a projection-ready state and sequentially project a plurality of reproduced images originating from the source (1) in a slide-show. It may instead project reproduced images corresponding to the source (2) or the source (3) in a slide-show. As a further alternative, instead of sequentially projecting a plurality of reproduced images in a slide-show, a specific image (e.g., the image most recently photographed with the digital camera 10A) stored in the memory card 250 or the internal memory (not shown) at the digital camera 10A may be projected. By adopting a structure that automatically retracts the lens barrel P as described above, the camera operations can be simplified and, at the same time, it is ensured that the lens barrel P is never present within the range of the angle of field of the projected light when the lens barrel P is set along the direction in which images are projected via the projector unit.

(Variation 3)

The presence of the digital camera 10A on the cradle 20 may be detected via a detection switch 1000 which may be, for instance a microswitch (see FIG. 7). In this case, the CPU 151 detects the level of a signal output from the microswitch 1000 and makes a decision as to whether or not the digital camera 10A is currently set on the cradle 20 based upon the detected signal value. If it is determined that the digital camera 10A is set on the cradle 20, the CPU 151 transmits a signal constituting an instruction that the lens barrel P (see FIG. 1) be retracted to the digital camera 10A, selects the projection mode as the operation mode and sequentially projects a plurality of reproduced images originating from the source (1) in a slide-show via the projector unit 120. Alternatively, it may project reproduced images corresponding to the source (2) or the source (3) in a slide-show. As a further alternative, instead of sequentially projecting a plurality of reproduced images in a slide-show, a specific image (e.g., the image most recently photographed with the digital camera 10A) stored in the memory card 250 or the internal memory (not shown) at the digital camera 10A may be projected.

Third Embodiment

Figure 8:
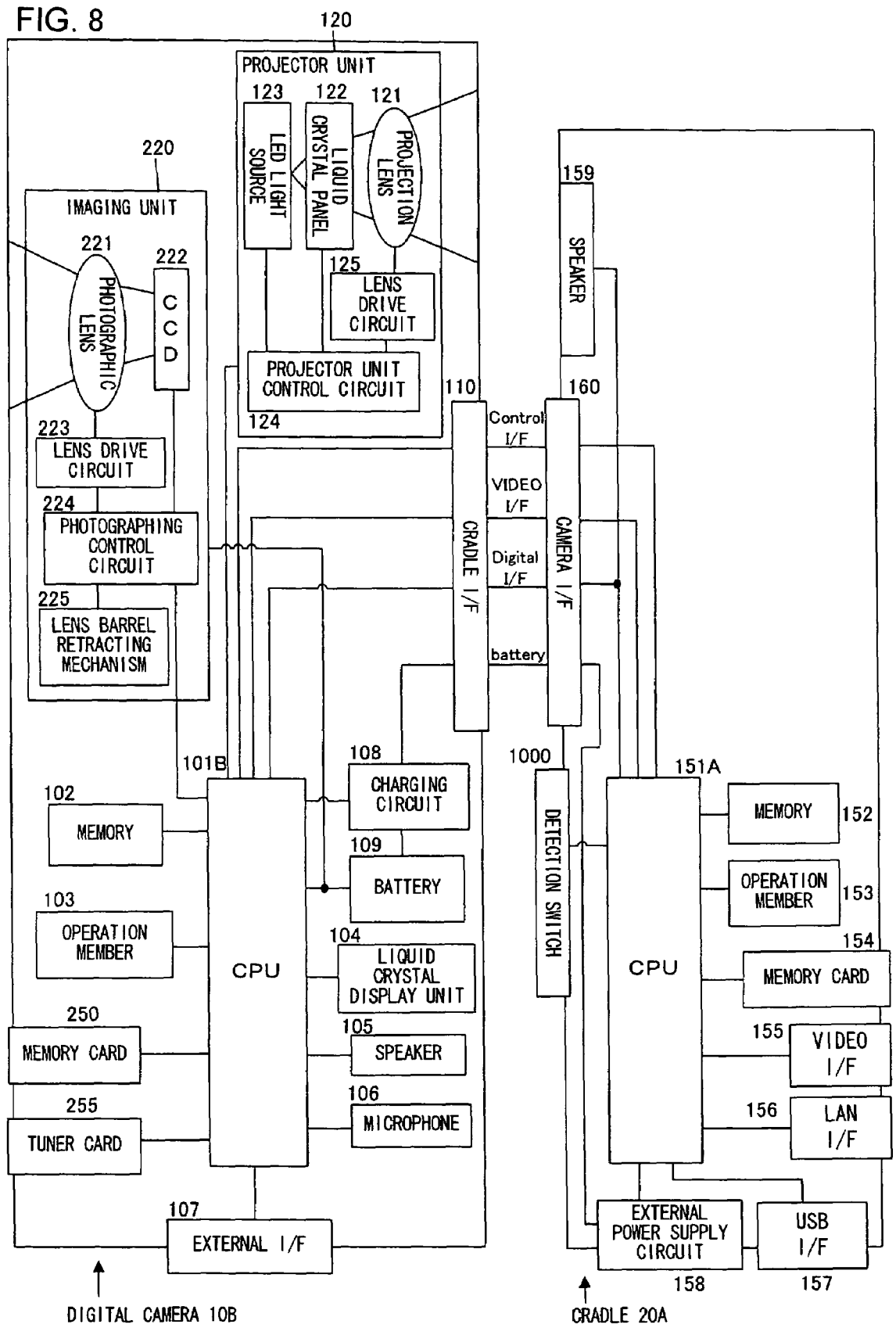
FIG. 8 is a block diagram of the structure adopted in a digital camera system achieved in a third embodiment.

The present invention may be adopted in a digital camera system that includes a digital camera equipped with a projector and a digital camera auxiliary device which is not equipped with a built-in projector device. FIG. 8 is a block diagram of such a digital camera system with a digital camera 10B equipped with a projector set on a cradle 20A. The same reference numerals are assigned to members in FIG. 8 identical to those in FIG. 7 in reference to which the second embodiment has been explained and their explanation is omitted. The digital camera 10B adopts an external structure similar to that of the digital camera 10 in FIGS. 1 and 2 and includes a cradle interface 110 that can be exposed to the outside as necessary.

A CPU 101B of the digital camera 10B makes a decision as to whether or not the digital camera 10B is currently set on the cradle 20A. The presence/absence of the digital camera 10B on the cradle may be judged based upon the signal value detected at a specific terminal within the cradle interface 110. A signal indicating the operating state of the microswitch 1000 disposed at the cradle 20A is transmitted to the specific terminal from a CPU 151A of the cradle 20A.

Upon judging that the digital camera 10B is currently set on the cradle 20A, the CPU 101B transmits to the imaging unit 220 a signal instructing that the lens barrel P (see FIG. 1) be retracted, also transmits a projection start instruction signal to the projector unit 120 and sequentially projects a plurality of reproduced images originating from the source (1) in a slide-show. More specifically, the CPU 101B engages the projector unit 120 to sequentially project a plurality of reproduced images originating from the source (1) described above (images reproduced by using image data corresponding to a plurality of image files stored in the memory card 250 or the internal memory (not shown) at the digital camera 10B) in a slide-show. It is to be noted that the image data used for the image reproduction may include both still images and dynamic images. Alternatively, reproduced images originating from the source (2) or the source (3) may be projected in a slide-show. As a further alternative, instead of sequentially projecting a plurality of reproduced images in a slide-show, a specific image (e.g., the image most recently photographed with the digital camera 10B) stored in the memory card 250 or the internal memory (not shown) at the digital camera 10B may be projected.

The detection switch 1000 used to judge whether or not the digital camera 10B is set on the cradle 20A may be disposed at the digital camera 10B instead. In such a case, the CPU 101B directly detects the level of the signal from the detection switch 1000 instead of checking the signal level via the specific terminal in the cradle interface 110 and makes a decision as to whether or not the digital camera 10B is set on the cradle based upon the detected signal value.

Fourth Embodiment

Figure 9:
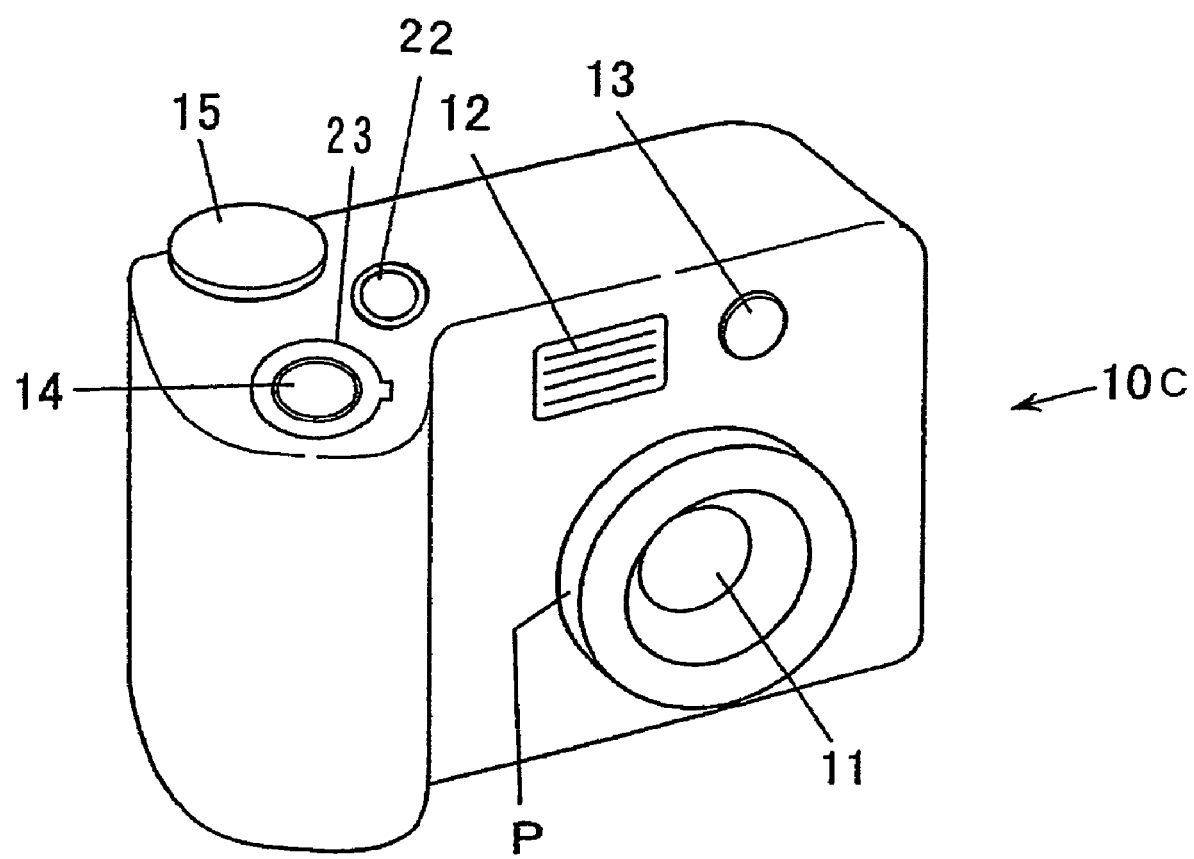
FIG. 9 is a perspective of a digital camera equipped with a projector achieved in a fourth embodiment of the present invention, viewed from the front side.

The following is an explanation of the fourth embodiment of the present invention given in reference to drawings. FIG. 9 is a perspective of a digital camera equipped with a projector achieved in the fourth embodiment of the present invention, viewed from the front side. As shown in FIG. 9, a photographic lens 11, an illuminating light window 12 and a projection window 13 are disposed at the front side of an digital camera 10C equipped with the projector. At the top surface (the surface of the casing turned to the upper side when the digital camera 10C is held sideways) of the digital camera 10C equipped with the projector, a shutter release button 14, a zoom switch 23, a mode selector dial 15 and a main switch 22 are disposed.

Figure 10:
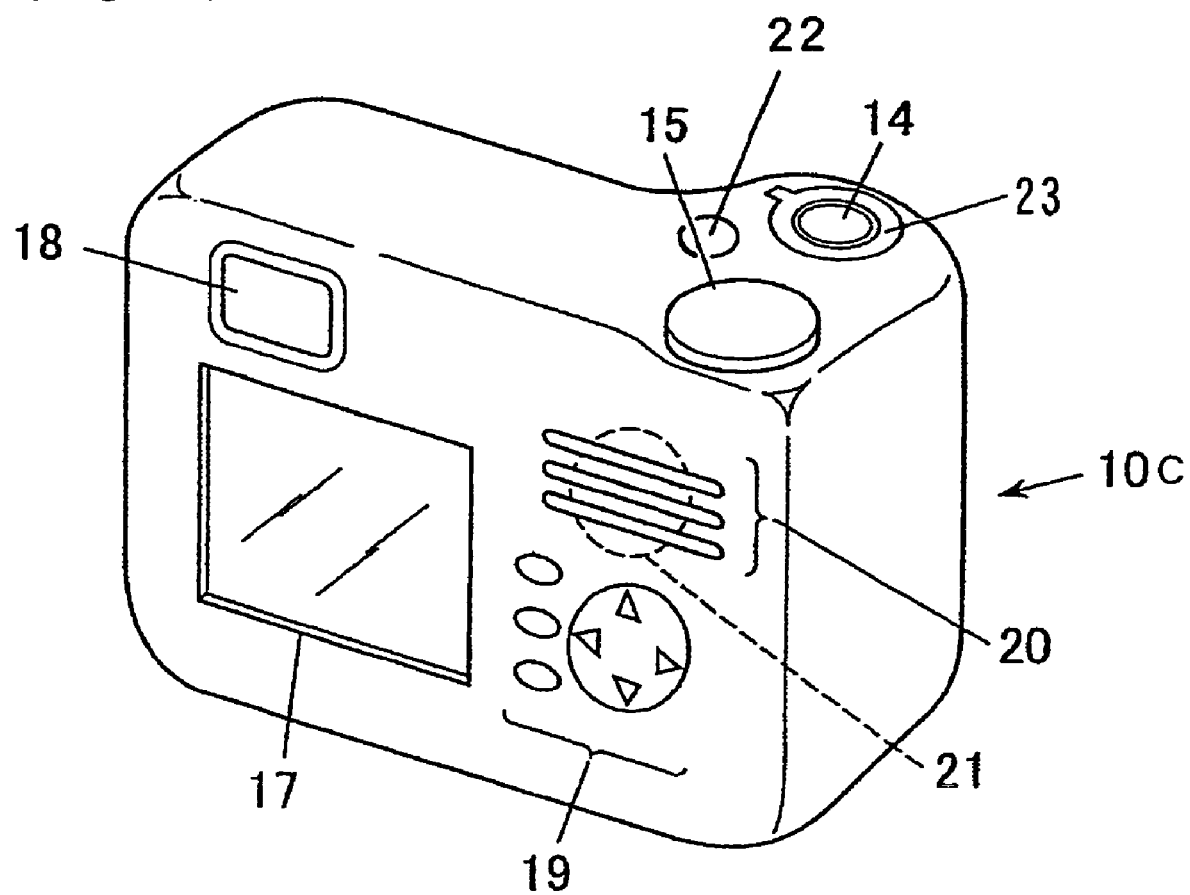
FIG. 10 is a perspective of the digital camera equipped with the projector in FIG. 9, viewed from the rear side.

FIG. 10 is a perspective of the digital camera 10C equipped with the projector in FIG. 9, viewed from the rear side. As shown in FIG. 10, a liquid crystal display unit 17, an electronic viewfinder 18, operation members 19 and speaker holes 20 are disposed at the rear surface (toward the photographer) of the digital camera 10C equipped with the projector.

Figure 11:
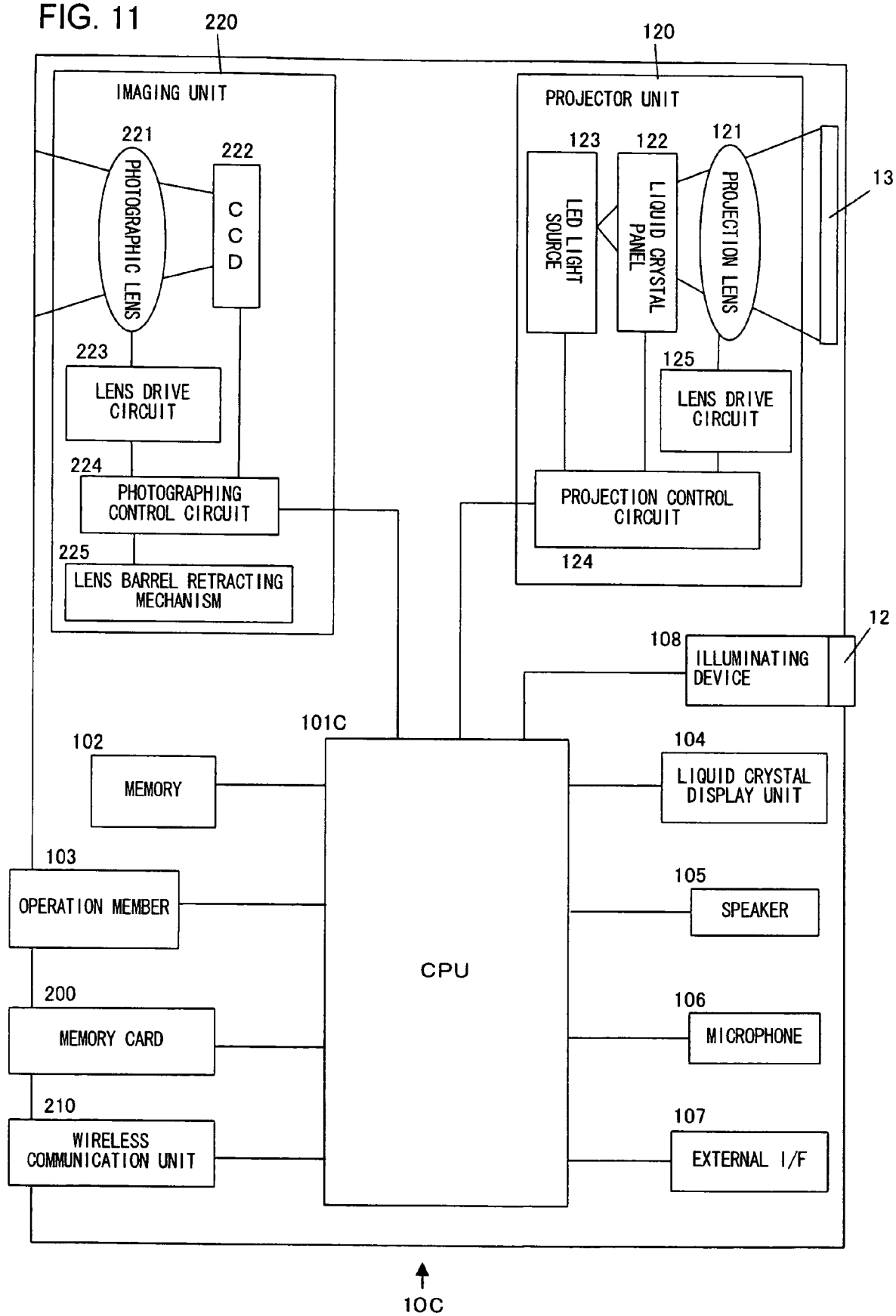
FIG. 11 is a block diagram of the structure adopted in the digital camera equipped with the projector.

FIG. 11 is a block diagram of the structure adopted in the digital camera 10C equipped with the projector described above. As shown in FIG. 11, the digital camera 10C equipped with the projector includes a projector unit 120, an imaging unit 220, a CPU 10C, a memory 102, an operation member 103, a liquid crystal display unit 104, a speaker 105, a microphone 106, an external interface (I/F) 107 and an illuminating device 108. A memory card 200 and a wireless communication unit 210 are loaded in card slots (not shown). The memory card 200 and the wireless communication unit 210 can both be loaded and unloaded freely.

It is to be noted that the same reference numerals are assigned to components in FIGS. 9 through 11 with functions similar to those in FIGS. 1 through 3 in reference to which the first through third embodiments have been explained, so as to preclude the necessity for a detailed explanation thereof.

The CPU 101C controls the photographing operation and the projection operation by executing specific arithmetic operations on signals input from the individual units constituting the digital camera 10C equipped with the projector and providing the resulting control signals to the various units of the digital camera 10C equipped with the projector, based upon a control program. It is to be noted that the control program is stored in a nonvolatile memory (not shown) within the CPU 101C.

The memory 102 is utilized as a work area by the CPU 101C. The operation member 103 corresponds to the main switch 22, the shutter release button 14, the zoom switch 23 and the mode selector dial 15 in FIG. 9 and also corresponds to the operation members 19 in FIG. 10. The operation member 103 includes a halfway press switch and a full press switch (neither shown) that enter an ON state by interlocking with depression of the shutter release button 14. The halfway press switch enters an ON state as the shutter release button 14 is depressed to an extent corresponding to a halfway press operation, whereas the full press switch enters an ON state when the shutter release button 14 is depressed to an extent corresponding to a full press operation, which is greater than the extent corresponding to the halfway press operation. Operation signals corresponding to specific operation details are transmitted from the operation member 103 to the CPU 101C.

The memory card 200 is constituted with a nonvolatile memory such as a flash memory, and data such as image data obtained by the imaging unit 220 through a photographing operation can be written and saved into the memory card 200 or such image data can be read out from the memory card 200 in response to a command issued by the CPU 101C. The wireless communication unit 210 receives data transmitted from an external apparatus (not shown), modulates the received data and outputs the image data and the audio data having undergone the modulation process to the CPU 101C.

(Imaging Unit)

The imaging unit 220 includes a photographic lens 221 (corresponds to reference numeral 11 in FIG. 9), an image sensor 222, a lens drive circuit 223, a photographing control circuit 224 and a lens barrel retracting mechanism 225. The image sensor 222 may be a CCD or CMOS imaging element. The photographing control circuit 224 controls the drive of the image sensor 222 and the lens drive circuit 223 based upon commands issued by the CPU 101C and executes specific types of image processing on imaging signals (electrical charge storage signals) output from the image sensor 222. The image processing includes white balance processing and gamma processing.

The photographic lens 221 forms a subject image onto the imaging surface of the image sensor 222. The photographing control circuit 224 engages the image sensor 222 to start an imaging operation in response to a photographing start instruction, reads out the electrical charge storage signals from the image sensor 222 once the imaging operation is completed and outputs the image data resulting from the image processing described above to the CPU 101C.

The lens drive circuit 223 drives forward/backward the focus lens (not shown) constituting part of the photographic lens 221 along the optical axis based upon a focus adjustment signal output from the photographing control circuit 224. In addition, upon receiving a zoom adjustment signal provided by the photographing control circuit 224, the lens drive circuit 223 drives the zoom lens (not shown) constituting the photographic lens 221 along the optical axis (toward the telephoto side or the wide-angle side), as indicated by the zoom adjustment signal. Extents of focus adjustment and zoom adjustment to be achieved are indicated to the photographing control circuit 224 by the CPU 101C.

(Focus Adjustment in the Camera)

The imaging unit 220 adjusts the focus of the photographic lens 221 by shifting the focus lens constituting the photographic lens 221 along the optical axis. For auto focus adjustment, the CPU 101C outputs to the photographing control circuit 224 a focus adjustment signal so as to achieve a maximum cumulative value (a focal point evaluation value) of the values of the high-frequency component indicated in the image signals corresponding to a focus detection area (e.g., the central area of the photographic image plane) among the image signals obtained by capturing an image at the image sensor 222. The focus lens position at which the focal point evaluation value peaks is equivalent to the focus-match position at which the highest contrast is achieved in the image captured by the image sensor 222 with the minimum level of blurring around the edges in the image.

(Zoom Adjustment in the Camera)

The imaging unit 220 executes an optical zoom adjustment for the photographic lens 221 by shifting the zoom lens constituting part of the photographic lens 221 along the optical axis. In response to an operation signal output via the zoom switch 23, the CPU 101C transmits a zoom adjustment signal to the photographing control circuit 224. The CPU 101C transmits a zoom adjustment signal indicating a zoom up if a right turn operation signal has been input from the zoom switch 23 and transmits a zoom adjustment signal indicating a zoom down if a left turn operation signal has been input from the zoom switch 23. The zoom switch 23 assumes a structure that allows it to selectively output either of the two different operation signals.

In addition, in response to a command issued by the CPU 10C, the photographing control circuit 224 outputs a command to the lens barrel retracting mechanism 225 so as to retract the lens barrel P (see FIG. 9) of the photographic lens 221 into the casing of the digital camera 10C equipped with the projector or extend the lens barrel P currently retracted in the casing to the photographing position (see FIG. 9).

(Projector Unit)

The projector unit 120 includes a projection lens 121, a liquid crystal panel 122, an LED light source 123, a projection control circuit 124 and a lens drive circuit 125. The projection control circuit 124 supplies a drive current to the LED light source 123 in response to a projection command output by the CPU 101C. The LED light source 123 illuminates the liquid crystal panel 122 with a brightness that corresponds to the supplied current.

In addition, the projection control circuit 124 generates a liquid crystal panel drive signal in correspondence to image data output from the CPU 101C and drives the liquid crystal panel 122 with the drive signals thus generated. More specifically, a voltage corresponding to the image signal is applied to each of the pixels at the liquid crystal layer. By modulating the voltage applied to the liquid crystal layer alters the liquid crystal molecular arrangement thereby changing the light transmittance at the liquid crystal layer. By modulating the light from the LED light source 123 in correspondence to the image signal as described above, an optical image is generated through the liquid crystal panel 122.

The optical image originating from the liquid crystal panel 122 is projected via the projection lens 121 toward a screen or the like disposed outside the digital camera 10C equipped with the projector. The lens drive circuit 125 drives forward/backward the projection lens 121 along a direction perpendicular to the optical axis based upon an offset adjustment signal output from the projection control circuit 124. In addition, the lens drive circuit 125 drives forward/backward the focus lens (not shown) constituting part of the projection lens 121 along the optical axis based upon a focus adjustment signal output from the projection control circuit 124. The lens drive circuit 125 also drives forward/backward the zoom lens (not shown) constituting part of the projection lens 121 along the optical axis based upon a zoom adjustment signal output from the projection control circuit 124. The extents of offset adjustment, focus adjustment and zoom adjustment to be achieved are indicated by the CPU 101C to the projection control circuit 124.

(Offset of Projection Image)

As the projection lens 121 is shifted along the direction perpendicular to the optical axis, the direction along which the light flux from the projector unit 120 advances changes, thereby offsetting the projection image. The projection image may be offset by shifting the liquid crystal panel 122 and the LED light source 123 along the direction perpendicular to the optical axis, instead of by shifting the projection lens 121. Namely, the projection image may be offset by altering the positional relationship between the projection lens 121 and the liquid crystal panel 122 along the direction perpendicular to the optical axis.

(Keystone Correction of Projection Image)

When shifting the projection lens 121, the liquid crystal panel 122 or the LED light source 123 along the direction perpendicular to the optical axis, the projection data undergo keystone correction in correspondence to the extent of the shift. If the projection image is simply offset as described above, the projection image will assume a trapezoidal shape, and for this reason, the CPU 101C needs to execute electrical keystone correction through image processing so as to correct the shape of the projection image, i.e., so as to adjust it from the trapezoidal shape to a rectangular shape. Initial correction values to be used to correct the shapes of projection images to a rectangular shape are stored in advance in the memory in the CPU 101C. The CPU 101C reads out the initial correction value corresponding to the extent of the offset adjustment, executes keystone correction processing for the projection image data in the memory 102 based upon the initial correction value thus read out and outputs the image data having undergone the keystone correction processing to the projection control circuit 124.

(Focus Adjustment for Projection Image)

As the focus lens constituting part of the projection lens 121 is shifted along the optical axis, the projector unit 120 adjusts the focus of the projection image. The CPU 101C transmits a focus adjustment signal corresponding to an operation signal from the operation member 103 to the projection control circuit 124 for manual focus adjustment.

For auto focus adjustment, the CPU 101C outputs to the projection control circuit 124 a focus adjustment signal so as to achieve a maximum cumulative value (a focal point evaluation value) of the values of the high-frequency component indicated in the image signals corresponding to a focus detection area (e.g., the central area of the photographic image plane) among the image signals obtained by capturing an image at the imaging unit 220. The focus lens position at which the focal point evaluation value peaks is equivalent to the focus adjustment position at which the highest contrast is achieved in the projection subject image with the minimum level of blurring around the edges in the image.

(Zoom Adjustment for Projection Image)

As the zoom lens constituting part of the projection lens 121 is shifted along the optical axis, the projector unit 120 executes zoom adjustment for the projection image. The CPU 101C transmits a zoom adjustment signal corresponding to an operation signal from the operation member 103 to the projection control circuit 124.

(Projection Sources)

In response to a command issued by the CPU 101C, the projector unit 120 reproduces and projects content corresponding to a specific source among (source 1) through (source 5) described below. The CPU 101C outputs image data to be used to project an image corresponding to a specific source so that each time a source changeover operation signal is input from the operation member 103, the image projection is switched cyclically to project images corresponding to sources (1) through (4) in the order of (1)->(2)->(3)->(4)->(1).... However, the source (1) is skipped if the memory card 200 is not loaded in the digital camera 10C equipped with the projector and the source (2) is skipped if the wireless communication unit 210 is not loaded. In addition, the source (4) is skipped if no external apparatus is connected to the external interface (I/F) 107.

Also, in response to a changeover operation signal indicating a changeover to chart projection, which is input from the operation member 103, the CPU 101C outputs image data originating from the source (5) detailed below to the projector unit 120.

(source 1) An image reproduced by using data read out from the memory card 200

(source 2) An image reproduced by using data received at the wireless communication unit 210

(source 3) An image reproduced by using image data recorded in the internal memory (such as the non-volatile memory in the CPU 10C)

(source 4) An image reproduced by using data input through the external interface (I/F) 107

(source 5) A chart used in the focus adjustment, such as an image of a black and white stripe pattern When an image corresponding to the source (1) or the source (3) is to be projected, the CPU 101C reads out the image data corresponding to the most recent recording date (the image data most recently photographed among the recorded image data) from the memory card 200 (or the internal memory) and outputs the image data thus read out to the projector unit 120.

Since the present invention is characterized by the operations executed when the projection mode is selected in the digital camera 10C equipped with the projector, the following explanation focuses on the control executed by the CPU 101C as the projection mode is selected.

FIG. 12 presents a flowchart of the processing executed in conformance to the program by the CPU 101C of the digital camera 10C equipped with the projector in the projection mode. The processing shown in FIG. 12 starts as an operation signal indicating a changeover to the projection mode is input to the CPU 101C from the mode selector dial 15.

In step S1 in FIG. 12, the CPU 101C outputs an imaging unit OFF instruction to the photographing control circuit 224 and also issues a display OFF instruction for the liquid crystal display unit 104 before the operation proceeds to step S2. As a result, the imaging operation at the imaging unit 220 stops and the display at the liquid crystal display unit 104 is turned off.

In step S2, the CPU 101C makes a decision as to whether or not the lens barrel P is currently in a retracted state. If a signal indicating a retracted state is received from the photographing control circuit 224, the CPU 101C makes an affirmative decision in step S2 to proceed to step S4A, whereas it makes a negative decision in step S2 if a signal indicating a non-retracted state is received to proceed to step S3.

In step S3, the CPU 101C outputs a retract command (instruction) to the photographing control circuit 224, and then the operation proceeds to step S4A. In step S4A, the CPU 101C issues a projection start instruction to the projection control circuit 124 and effects function adjustments at the shutter release button 14 and the zoom switch 23 constituting the operation member 103 and disposed at the top surface of the digital camera 10C equipped with the projector before the operation proceeds to step S5. In response to the projection start instruction, the LED light source 123 is turned on at the projector unit 120.

Following step S4A, the shutter release button 14 and the zoom switch 23 are used as operation members with functions different from those in the photographing mode until the function adjustments are cleared in step S11 as described later. While the function adjustments are in effect, the shutter release button 14 does not function as an operation member operated to issue a photographing instruction, but instead functions as an operation member operated to start autofocus adjustment for the projection image, switch to project a chart image corresponding to the source (5) for focus adjustment, rotate the projection image or pause the projection operation.

Instead of functioning as the zoom adjustment operation member operated to adjust the zoom at the photographic lens 221, the zoom switch 23 functions as an operation member operated for zoom adjustment at the projection lens 121, i.e., for zoom adjustment of the projection image.

In step S5, the CPU 101C reads out the image data with the most recent recording date from the memory card 200 and outputs the image data thus read out to the projector unit 120 before the operation proceeds to step S6. It is to be noted that while image data are read out from the memory card 200 at the default setting, the default setting may be modified so as to read out image data from the internal memory at the CPU 101C. As a result, an image reproduced by using the image data output by the CPU 101C to the projector unit 120 is projected. It is also to be noted that if audio data are stored in correspondence to the data file of the currently projection image, the CPU 101C reproduces sound through the speaker 105 by using the audio data. The stored image data may contain both still image data files and dynamic image data files.

In step S6, the CPU 101C makes a decision as to whether or not a user operation has been performed. The CPU 101C makes an affirmative decision in step S6 if an operation signal has been input through the operation member 103 (see FIG. 11) to proceed to step S7, whereas it makes a negative decision in step S6 if no operation signal has been input through the operation member 103 to proceed to step S9.

In step S9, the CPU 101C makes a decision as to whether or not the image data output to the projector unit 120 originate from either the source (1) or the source (3) (i.e., whether or not the image data output to the projector unit are a recorded image. The CPU 101C makes an affirmative decision in step S9 if the image data output to the projector unit 120 are a recorded image to proceed to step S10, whereas it makes a negative decision in step S9 if the image data output to the projector unit 120 are an image from either the source (2) or the source (4), i.e., an unrecorded image to return to step S6.

In step S10, the CPU 101C makes a decision as to whether or not the time is up. If a specific length of time (e.g., 5 seconds) has been counted on an internal timer, the CPU 101C makes an affirmative decision in step S10 to return to step S5. If, on the other hand, the specific length of time has not elapsed, a negative decision is made in step S10 to return to step S6. It is to be noted that the length of time counted prior to the time-up indicates the length of time having elapsed after reading out the data corresponding to the currently projection image.

The operation returns to step S5 from step S10 to execute a slide-show projection. Namely, an image reproduced by using image data read out from the memory card 200 (or the internal memory) is projected, after 5 seconds elapses, the next image data are read out from the memory card 200 (or the internal memory) and the image projection is updated with the image reproduced by using the most recently read out image data. It is to be noted that the length of the projection time per image during the slide-show projection does not need to be 5 seconds, and the length of the projection time can be adjusted as necessary.

In step S7, to which the operation proceeds after making an affirmative decision in step S6, the CPU 101C makes a decision as to whether or not the user has performed a mode switching operation. The CPU 101C makes an affirmative decision in step S7 if the operation signal has been input from the mode selector dial 15, indicating a changeover to the photographing mode, and in this case, the operation proceeds to step S11. If source changeover operation signals from the shutter release button 14 and the zoom switch 23 have been input, e.g., if an operation signal from the zoom switch 23 and a halfway press operation signal from the shutter release button 14 have been input simultaneously, the CPU 101C makes a negative decision in step S7 to proceed to step S8. Moreover, if an operation signal has been input either from the shutter release button 14 or the zoom switch 23, the CPU 101C also makes a negative decision in step S7 and in this case, the operation proceeds to step S12. The operation proceeds to step S8 on the assumption that a source changeover instruction has been issued, whereas the operation proceeds to step S12 on the assumption that a projection adjustment instruction has been issued.

In step S11, the CPU 101C issues a projection end instruction to the projection control circuit 124 and clears the function adjustments at the shutter release button 14 and the zoom switch 23, thereby ending the processing in FIG. 12. As the processing ends, the LED light source 123 at the projector unit 120 goes off. It is to be noted that if the projection contents have originated from the source (1), the data having been read out from the memory card 200 are not saved in the memory 102. If the projection contents have originated from the source (2), the data having been received at the wireless communication unit 210 are not saved in the memory 102. In addition, if the projection contents have originated from the source (4), the data having been received via the external interface 107 are not saved in the memory 102.

In step S8, the CPU 101C switches the source of the image data to be output to the projector unit 120 by one setting so that the sources are switched in the order of; (source 1)-> (source 2)->(source 3)->(source 4)->(source 1) . . . , each time an operation signal from the zoom switch 23 and a halfway press operation signal from the shutter release button 14 are simultaneously input. Then the operation proceeds to step S9.

In step S12, the CPU 101C executes projection adjustment processing and then the operation proceeds to step S9. The projection adjustment processing is now explained in detail in reference to the flowchart presented in FIG. 13. In step S51 in FIG. 13, the CPU 101C makes a decision as to whether or not the user has operated the zoom switch 23 at the operation member 103. The CPU 101C makes an affirmative decision in step S51 if the operation signal input thereto has originated from the zoom switch 23 to proceed to step S52, whereas it makes a negative decision in step S51 if the operation signal has not originated from the zoom switch 23 to proceed to step S53.

In step S52, the CPU 101C executes optical zoom processing, before returning to step S51. The CPU 101C may execute the optical zoom processing by, for instance, outputting a zoom adjustment signal to the projection control circuit 124 so as to zoom up the projection image if the zoom switch 23 has been turned to the right and outputting a zoom adjustment signal to the projection control circuit 124 so as to zoom down the projection image if the zoom switch 23 has been turned to the left.

In step S53, the CPU 101C makes a decision as to whether or not the user has pressed the shutter release button 14 halfway down (i.e., whether or not an operation signal has been output from the halfway press switch). The CPU 101C makes an affirmative decision in step S53 if the operation signal input thereto is a halfway press operation signal to proceed to step S54, but makes a negative decision in step S53 if a halfway press operation signal has not been input to proceed to step S56.

In step S54, the CPU 101C makes a decision as to whether or not the shutter release switch has been held down. The CPU 101C makes a negative decision in step S54 if the halfway press operation signal has been cleared within a predetermined length of time (e.g., 3 seconds) to proceed to step S55, whereas it makes an affirmative decision in step S54 if the halfway press operation signal has been sustained over a length of time equal to or greater than the predetermined length of time to proceed to step S59.

A halfway press operation signal generated when the shutter release button 14 has been pressed halfway down without being held down over a significant length of time is equivalent to an autofocus (AF) instruction. In step S55, the CPU 101C starts AF processing, and then the operation returns to step S51. More specifically, it issues an imaging unit ON instruction to the photographing control circuit 224 and also transmits a focus adjustment signal to the projection control circuit 124 so as to achieve the maximum value for the focal point evaluation value calculated based upon image signals provided by the imaging unit 220. It is to be noted that once the AF processing is completed, the CPU 101C issues an imaging unit OFF instruction to the photographing control circuit 224.

A halfway press operation signal generated when the shutter release button 14 has been pressed halfway down and held at the halfway press position is equivalent to a chart projection ON/OFF switching instruction. In step S59, the CPU 101C makes a decision as to whether or not the chart for the focus adjustment originating from the source (5) is currently projected. If the chart image is being projected, i.e., if the focus adjustment chart image data have already been output to the projector unit 120, the CPU 101C makes an affirmative decision in step S59 to proceed to step S60, whereas it makes a negative decision in step S59 if a reproduced image originating from any source among the source (1) through the source (4) is currently being projected to proceed to step S61.

In step S60, the CPU 101C turns off the chart projection. Namely, it outputs to the projector unit 120 the image data originating from a specific source among the source (1) through the source (4), which have been most recently projected prior to the chart image projection, so as to project a reproduced image by using the image data instead of the chart image. The operation then returns to step S51.

In step S61, the CPU 101C turns on chart projection. Namely, it outputs to the projector unit 120 the chart image data from the source (5) so as to project the chart image instead of the currently projected reproduced image originating from a source among the source (1) through the source (4), before returning to step S51.

In step S56, the CPU 101C makes a decision as to whether or not the user has pressed the shutter release button 14 all the way down, i.e., whether or not an operation signal has been output from the full press switch. The CPU 101C makes an affirmative decision in step S56 if the operation signal input thereto is a full press operation signal to proceed to step S57. However, it makes a negative decision in step S56 if a full press operation signal has not been input, ends the processing in FIG. 13 and proceeds to step S9 in FIG. 12.

In step S57, the CPU 101C makes a decision as to whether or not the shutter release switch has been held down. The CPU 101C makes a negative decision in step S57 if the full press operation signal has been cleared within a predetermined length of time (e.g., 3 seconds) to proceed to step S58, whereas it makes an affirmative decision in step S57 if the full press operation signal has been sustained over a length of time equal to or greater than the predetermined length of time to proceed to step S62.

A full press operation signal generated when the shutter release button 14 has been pressed all the way down without holding it at the full press position over a significant length of time is equivalent to a projection image rotation instruction.

In step S58, the CPU 101C rotates the projection image as explained below, before returning to step S51.

(Rotation of Projection Image)

The CPU 101C rotates the image data by 90° in the clockwise direction in the memory 102 and outputs the image data having undergone the rotation processing to the projector unit 120. The CPU 101C also executes size conversion processing based upon the aspect ratio of the projection image so as to ensure that the rotated image is contained within the projection range. For instance, if the aspect ratio of the image data is 4 (lateral):3 (longitudinal) and the aspect ratio of the liquid crystal panel 122, too, is 4 (lateral):3 (longitudinal), the data size of the rotated image is reduced by a factor of ¾ with regard to the numbers of pixels along the longitudinal and lateral directions. As a result, an image having undergone the rotation processing and the reduction processing so as to match the length of the longer side of the image plane with the shorter side of the liquid crystal panel 122 is projected (see FIGS. 5 and 6).

The CPU 101C repeatedly executes the size conversion processing and the rotation processing described above each time a projection image rotation instruction is input. As the size conversion processing, reduction processing for reducing the numbers of pixels along the longitudinal and the lateral directions both by a factor of ¾ (for matching the longer side of the image with the shorter side of the liquid crystal panel 122) and enlargement processing for increasing the numbers of pixels along the longitudinal direction and the lateral direction by a factor of 4/3 (for matching the longer side of the image plane with the longer side of the liquid crystal panel 122) are alternately executed in correspondence to the aspect ratio mentioned earlier. Accordingly, if the projection image rotation instruction is issued four times in a row, the projection image rotates a full cycle in the clockwise direction and after the fourth instruction, the size of the projection image is reset to the size it was before the first projection image rotation instruction was issued. It is to be noted that the projection image may be rotated in the counterclockwise direction instead.

A full press operation signal generated when the shutter release button 14 has been pressed all the way down and held at the full press position is equivalent to a projection operation pause/clear changeover instruction. In step S62, the CPU 101C makes a decision as to whether or not the projection operation has been paused. The CPU 101C makes an affirmative decision in step S62 if the projection operation has been paused to proceed to step S63, whereas it makes a negative decision in step S62 if a projection operation is currently in progress, to proceed to step S64.

In step S63, the CPU 101C clears the paused state. More specifically, the CPU 101C outputs a command for the projection control circuit 124 to resume power supply to the LED light source 123 and the liquid crystal panel 122, before returning to step S51. As a result, the optical image projection by the projector unit 120 resumes.

If the current projection contents have originated from the source (1), information with regard to the memory card 200 and the data having been read from the memory card 200 are saved into the memory 102 during the pause. Likewise, if the current projection contents have originated from the source (2), the communication between the wireless communication unit 210 and the external apparatus is sustained and the data received at the wireless communication unit 210 are saved into the memory 102 during the pause. If the current projection contents have originated from the source (4), the communication between the external interface 107 and the external apparatus is sustained and the data received at the external interface 107 are saved into the memory 102 during the pause. Since the data are saved in the memory 102 in the event of a pause, as described above, the projection can be immediately resumed by using the data saved in the memory 102 as soon as the pause is cleared.

In step S64, the CPU 101C pauses the projection operation. Namely, the CPU 101C outputs a command for the projection control circuit 124 to stop the power supply to the LED light source 123 and the liquid crystal panel 122, before returning to step S51. In this state, the projector unit 120 no longer projects an optical image.

The following operational effects can be achieved in the fourth embodiment described above.

(1) As the projection mode is selected in the digital camera 10C equipped with the projector, it automatically projects images reproduced by using image data recorded in the memory card 200 in a slide-show (steps S4A through S6, steps S9 and S10). This means that after the camera is set in the projection mode, the user does not need to turn on the projection lamp (the LED light source 123) or select an image to be projected. As a result, a higher level of operability of the digital camera 10C equipped with the projector is assured in the projection mode.

(2) As the projection mode is selected in the digital camera 10C equipped with the projector, function adjustments are effected so as to allow the shutter release button 14 to function as an operation member operated to start autofocus adjustment for the projection image, switch the projection image to the focus adjustment chart image originating from the source (5), rotate the projection image and pause the projection operation and to allow the zoom switch 23 to function as an operation member operated to execute zoom adjustment of the projection image (step S4A). This means that the digital camera 10C does not require any additional operation members for a projection operation.

(3) The function adjustments described in (2) above are effected for the operation members 14 and 23 disposed at the top surface of the casing of the digital camera 10C equipped with the projector. Thus, when the digital camera 10C equipped with the projector is set on, for instance, a desk and is engaged in a projection operation, the operation members 14 and 23, which can be visually checked from any direction, assure better operability than an operation member disposed at the rear surface of the casing. Furthermore, since the operation members 14 and 23 disposed at the top surface of the casing can be operated without causing a significant movement of the casing, the likelihood of the projection image becoming displaced as the operation member 14 or 23 is operated is minimal.

(4) The digital camera 10C equipped with the projector cyclically switches the projection image so as to project an image originating from a specific source among the sources (1) through (4) each time a source changeover instruction is issued in the projection mode. Thus, a reproduced image can be projected via the projector unit 120 regardless of the format of the image data or the image signals input to the digital camera 10C equipped with the projector. In addition, the projection contents can be selected through a simple operation.

In the example explained above, image data recorded in the memory card 200 are selected and images reproduced by using the selected image data are automatically projected in a slide-show when the digital camera 10C equipped with the projector is set to the projection mode. More specifically, when the processing in step S5 in FIG. 12 is executed for the first time, image data are read out from the memory card 200. Alternatively, images reproduced by using image data recorded in the internal memory corresponding to the source (3) may be projected.

In addition, when the projection mode is selected in the digital camera 10C equipped with the projector, an image corresponding to either the source (2) or the source (4) may be selected and projected instead.

In the explanation given above, the shutter release button 14 and the zoom switch 23 are described as examples of operation members that may be disposed at the top surface of the casing of the digital camera 10C equipped with the projector. However, the present invention is not limited to this example and an operation member other than the shutter release button 14 or the zoom switch 23 may be used as long as it is located at the upper side when the digital camera 10C equipped with the projector is set on a flat surface or as long as it is located on the upper side when the digital camera 10C is locked onto a tripod or the like.

The zoom switch 23 may be constituted with a rocker switch that selectively outputs one of two different operation signals instead of the rotary switch described above. In addition, it may be constituted with two switches independent of each other, i.e., a "zoom up" switch and a "zoom down" switch.

Combinations other than those described above may be adopted with regard to the correlations of the four individual operation modes, i.e., the halfway press operation, the sustained halfway press operation, the full press operation and the sustained full press operation, each interlocking with a depression of the shutter release button 14, to the four different instructions, i.e., the AF start instruction, the chart projection ON/OFF switching instruction, the projection image rotation instruction and the projection operation pause/clear changeover instruction.

(Variation 4)

When the projection mode is selected in the digital camera 10C equipped with the projector, the zoom switch 23 may function as an operation member to be operated to forward/reverse a frame feed for the image projection, instead of as the operation member to be operated to execute zoom adjustment for the projection image.

In this case, the CPU 101C should read out the image data in the frame immediately preceding the currently projection image from the memory card 200 (or the internal memory) and output the image data thus read out to the projector unit 120 in response to a left turn operation signal input from the zoom switch 23 while projecting an image originating from the source (1) or the source (3) via the projector unit 120. As a result, the currently projection image will be replaced by the image in the immediately preceding frame projected via the projector unit 120. The left turn operation signal is equivalent to a frame reverse instruction.

The CPU 101C should read out the image data in the frame immediately following the currently projection image from the memory card 200 (or the internal memory) and output the image data thus read out to the projector unit 120 in response to a right turn operation signal input from the zoom switch 23 while projecting an image originating from the source (1) or the source (3) via the projector unit 120. As a result, the currently projection image will be replaced by the image in the immediately following frame projected via the projector unit 120. The right turn operation signal is equivalent to a frame forward instruction.

(Variation 5)

As the projection mode is selected in the digital camera 10C equipped with the projector, a function adjustment may be effected so as to allow the zoom switch 23 to function as an operation member to be operated to execute manual focus adjustment for the projection image.

In this case, in response to a right turn operation signal input from the zoom switch 23, the CPU 101C outputs a focus adjustment signal to the projection control circuit 124 so as to move the focus lens constituting the projection lens 121 further toward the close-up side in correspondence to the extent to which the zoom switch 23 has been operated. If, on the other hand, a left turn operation signal is input from the zoom switch 23, the CPU 101C outputs a focus adjustment signal to the projection control circuit 124 so as to move the focus lens further toward the infinity side in correspondence to the extent to which the zoom switch 23 has been operated.

(Variation 6)

As the projection mode is selected in the digital camera 10C equipped with the projector, a function adjustment may be effected so as to allow the zoom switch 23 to function as an operation member to be operated to execute keystone correction adjustment for the projection image.

In this case, in response to a right turn operation signal input from the zoom switch 23, the CPU 101C applies a gain greater than 1 to the initial correction value used to correct the shape of the projection image to a rectangular shape in correspondence to the extent to which the zoom switch 23 has been operated. In addition, in response to a left turn operation signal input from the zoom switch 23, the CPU 101C applies a gain smaller than 1 to the initial correction value in correspondence to the extent to which the zoom switch 23 has been operated. The CPU 101C then executes keystone correction processing on the projection image data in the memory 102 based upon the initial correction value to which the gain has been applied and outputs the image data having undergone the keystone correction processing to the projection control circuit 124.

While an explanation is given above in reference to the fourth embodiment and variations 4 through 6 on an example in which the present invention is adopted in the digital camera 10C equipped with an integrated projector, the present invention may also be adopted in a digital camera system in which a projector is detachably mounted on a digital camera. Under such circumstances, the digital camera system shifts into the projection mode as the projector is mounted at an accessory shoe (not shown) of the digital camera, thereby starting up a program similar to that shown in FIG. 12. It is to be noted that the CPU 101C in the digital camera and the projection control circuit 124 at the projector exchange data via a signal terminal (not shown) disposed together with the accessory shoe. An operation signal from the operation member at the digital camera is transmitted to the projector side via the signal terminal.

It is to be noted that the digital camera system may be constituted with a digital camera and a cradle (a digital camera auxiliary device) that includes a built-in projector, as in the second embodiment explained earlier. In such a case, a program similar to that shown in FIG. 12 may be started up as the digital camera set on the cradle is switched to the projection mode, as the digital camera is set on the cradle, or as a digital camera charge via the cradle is completed. In addition, as in the third embodiment described above, the digital camera system may be constituted with a digital camera equipped with a projector and a digital camera auxiliary device at which the digital camera equipped with the projector is detachably mounted.

The embodiments explained above simply represent examples and the correspondence between the components of the embodiments and the components of the present invention does not bear any limitations whatsoever in the interpretation of the present invention.

The above described embodiments are examples, and various modifications can be made without departing from the scope of the invention.

What is claimed is:

1. A digital camera equipped with a projector, comprising:
    a photographing device;
    a projector device that projects an optical image;
    a mode switching operation member that outputs a switching operation signal indicating a changeover to one of a photographing operation mode in which image data photographed by the photographing device are saved as a photographic image file in a recording medium and a projection operation mode in which a reproduced image is projected by the projector device;
    a top surface operation member disposed at an upper surface of a casing;
    a function adjustment device that adjusts a function of the top surface operation member so that the top surface operation member functions as (a) an operation member for a photographing operation when the photographing operation mode is selected and (b) an operation member for a projection operation when the projection mode is selected;
    a projection control device that controls the projector device based upon an operation signal provided by the top surface operation member upon receiving a switching operation signal indicating a changeover to the projection operation mode from the mode switching operation member; and
    a photographing control device that controls the photographing device based upon an operation signal provided by the top surface operation member upon receiving a switching operation signal indicating a changeover to the photographing operation mode from the mode switching operation member, wherein
    the photographing device comprises a photographic optical system having a photographic lens; and
    the projector device comprises a projection optical system having a projection lens that is different from the photographic lens, and wherein said digital camera further comprises:
    a retracting device that retracts the photographic optical system, wherein upon receiving a switching operation signal indicating a changeover to the projection operation mode from the mode switching operation member, the projection control device issues an instruction for the retracting device to retract the photographic optical system.

2. A digital camera equipped with a projector according to claim 1, wherein:
    the top surface operation member includes a shutter release operation member that outputs operation signals each corresponding to a halfway press operation mode or a full press operation mode; and
    the photographing control device controls the photographing device so as to execute photographing processing in correspondence to a signal indicating one of the halfway press operation mode and the full press operation mode provided by the shutter release operation member.

3. A digital camera equipped with a projector according to claim 2, wherein:
    the projection control device issues one of a focus adjustment start instruction, a reproduced image projection instruction, a projection image rotation instruction and a projection pause instruction for the projector device based upon a signal indicating one of the halfway press operation mode and the full press operation mode provided by the shutter release operation member and a length of time over which the signal is sustained.

4. A digital camera equipped with a projector according to claim 1, wherein:
    the top surface operation member includes a selective operation member that selectively outputs one of various operation signals;
    the photographing control device controls the photographing device so as to execute zoom adjustment in correspondence to an operation signal provided by the selective operation member; and
    the projection control device controls the projector device so as to execute zoom adjustment in correspondence to an operation signal provided by the selective operation member.

5. A digital camera equipped with a projector according to claim 1, wherein:
    the top surface operation member includes a selective operation member that selectively outputs one of various operation signals;
    the photographing control device controls the photographing device so as to execute zoom adjustment in correspondence to an operation signal provided by the selective operation member; and
    the projection control device controls the projector device so as to execute focus adjustment in correspondence to an operation signal provided by the selective operation member.

6. A digital camera equipped with a projector according to claim 1, wherein:
    the top surface operation member includes a selective operation member that selectively outputs one of various operation signals;
    the photographing control device controls the photographing device so as to execute zoom adjustment in correspondence to an operation signal provided by the selective operation member; and
    the projection control device controls the projector device so as to forward or reverse a frame of a projection image in correspondence to an operation signal provided by the selective operation member.

7. A digital camera equipped with a projector according to claim 1, wherein:
    the top surface operation member includes a selective operation member that selectively outputs one of various operation signals;
    the photographing control device controls the photographing device so as to execute zoom adjustment in correspondence to an operation signal provided by the selective operation member; and
    the projection control device controls the projector device so as to execute keystone correction adjustment in correspondence to an operation signal provided by the selective operation member.

8. A digital camera equipped with a projector according to claim 1, wherein:
    upon receiving a switching operation signal indicating a changeover to the projection operation mode from the mode switching operation member, the projection control device controls the projector device so as to automatically reproduce and project in sequence a plurality of photographic image files saved in the recording medium after executing projection adjustment processing corresponding to an operation signal provided from the top surface operation member.

9. A digital camera equipped with a projector according to claim 1, further comprising:
a side surface operation member disposed at a side surface of the casing, wherein:
the photographing control device controls the photographing device in response to operation signals provided by the top surface operation member and the side surface operation member.

10. A digital camera equipped with a projector, comprising:
a photographing device;
a projector device that projects an optical image;
a mode switching operation member that outputs a switching operation signal indicating a changeover to one of a photographing operation mode in which image data photographed by the photographing device are saved as a photographic image file in a recording medium and a projection operation mode in which a reproduced image is projected by the projector device;
a top surface operation member disposed at an upper surface of a casing;
a function adjustment device that adjusts a function of the top surface operation member so that the top surface operation member functions as (a) an operation member for a photographing operation when the photographing operation mode is selected and (b) an operation member for a projection operation when the projection mode is selected;
a projection control device that controls the projector device based upon an operation signal provided by the top surface operation member upon receiving a switching operation signal indicating a changeover to the projection operation mode from the mode switching operation member; and
a photographing control device that controls the photographing device based upon an operation signal provided by the top surface operation member upon receiving a switching operation signal indicating a changeover to the photographing operation mode from the mode switching operation member, wherein
the top surface operation member includes a shutter release operation member that outputs operation signals each corresponding to a halfway press operation mode or a full press operation mode and a rotary selective operation member that selectively outputs one of various operation signals, and
the function adjustment device individually adjusts functions of the shutter release operation member and the selective operation member in response to a switching operation signal provided by the mode switching operation member.

* * * * *